US012266878B2

(12) United States Patent
Du et al.

(10) Patent No.: US 12,266,878 B2
(45) Date of Patent: Apr. 1, 2025

(54) ELECTRICAL INTERCONNECT WITH IMPROVED IMPEDANCE

(71) Applicant: Intel Corporation, Santa Clara, CA (US)

(72) Inventors: Daqiao Du, Lake Oswego, OR (US); Zhen Zhou, Chandler, AZ (US); Ismael Franco Núñez, Milwaukie, OR (US); Gordon P. Melz, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 675 days.

(21) Appl. No.: 17/484,865

(22) Filed: Sep. 24, 2021

(65) Prior Publication Data

US 2022/0013944 A1 Jan. 13, 2022

(51) Int. Cl.

| | |
|---|---|
| ***H01R 13/00*** | (2006.01) |
| ***H01R 12/71*** | (2011.01) |
| ***H01R 13/05*** | (2006.01) |
| ***H01R 13/11*** | (2006.01) |
| ***H01R 43/00*** | (2006.01) |

(52) U.S. Cl.

CPC ......... *H01R 13/052* (2013.01); *H01R 12/712* (2013.01); *H01R 13/111* (2013.01); *H01R 43/00* (2013.01)

(58) Field of Classification Search

CPC .. H01R 13/052; H01R 12/712; H01R 13/111; H01R 43/00

See application file for complete search history.

(56) References Cited

U.S. PATENT DOCUMENTS

| | | | | |
|---|---|---|---|---|
| 4,666,232 A * | 5/1987 | Shyu | H01R 24/40 | 439/669 |
| 6,328,615 B1 * | 12/2001 | Safai | H01R 43/16 | 439/825 |
| 7,256,593 B2 * | 8/2007 | Treibergs | G01R 1/0466 | 324/763.01 |
| 8,460,010 B2 * | 6/2013 | Kimura | H01R 13/2492 | 439/66 |
| 8,721,372 B2 * | 5/2014 | Hasegawa | G01R 1/0483 | 439/701 |
| 8,808,037 B2 * | 8/2014 | Park | H01R 12/714 | 439/700 |
| 9,362,687 B1 * | 6/2016 | Ju | H01R 13/6633 | |
| 9,797,925 B2 * | 10/2017 | Teranishi | G01R 1/06738 | |

* cited by examiner

*Primary Examiner* — Phuong Chi Thi Nguyen
(74) *Attorney, Agent, or Firm* — Alliance IP, LLC

(57) ABSTRACT

An apparatus comprising an interconnect comprising a conductive core; a first conductive layer connected to the conductive core and extending parallel to the conductive core towards a first end of the conductive core; a second conductive layer connected to the conductive core and extending parallel to the conductive core towards a second end of the conductive core; a first non-conductive layer between the conductive core and the first conductive layer; and a second non-conductive layer between the first conductive layer and the second conductive layer.

20 Claims, 14 Drawing Sheets

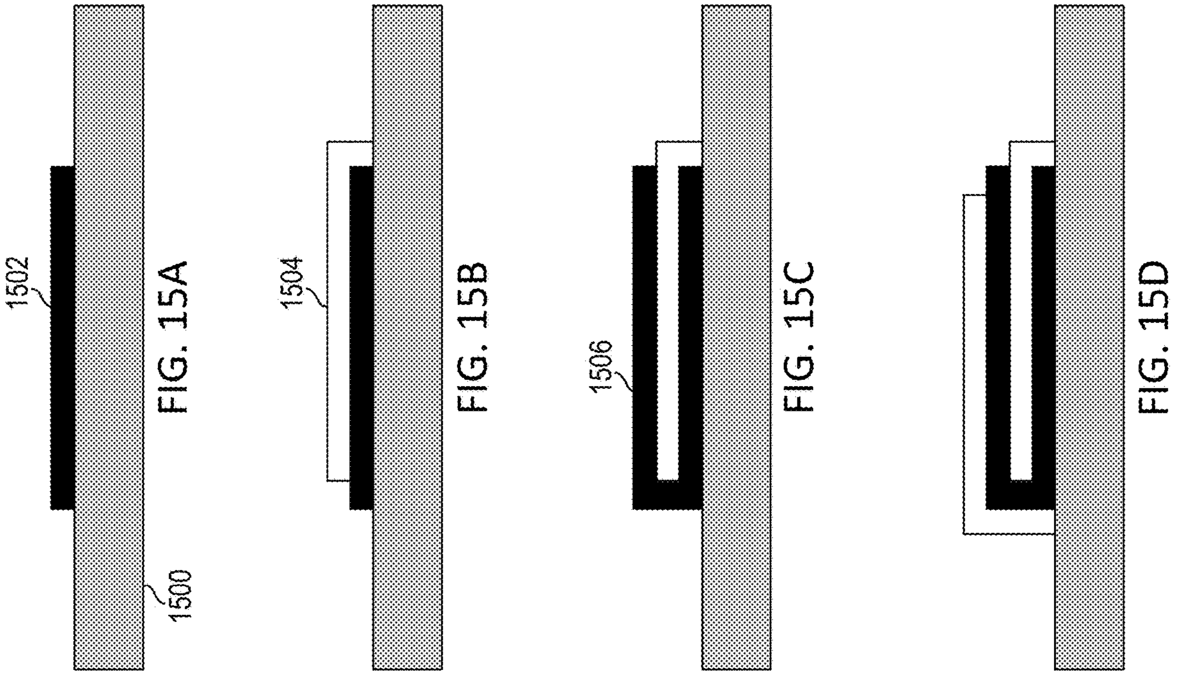
FIG. 15A
FIG. 15B
FIG. 15C
FIG. 15D
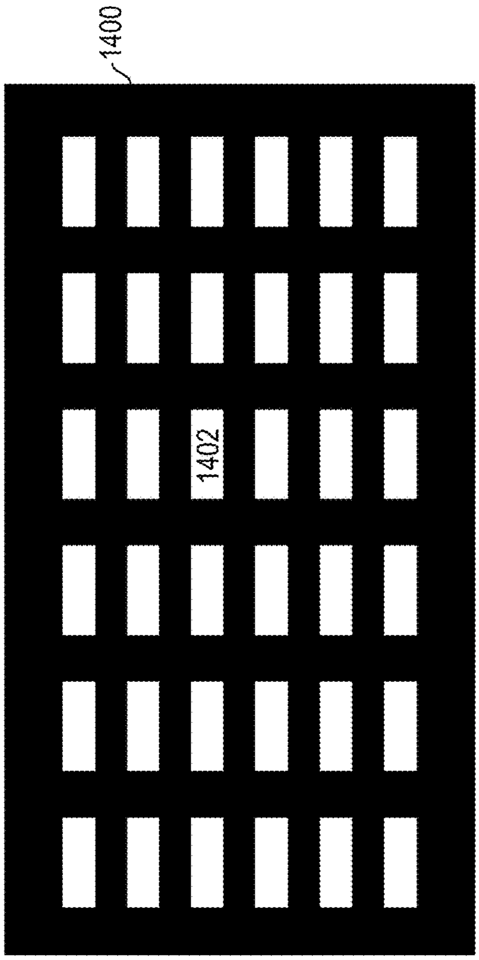
FIG. 14A
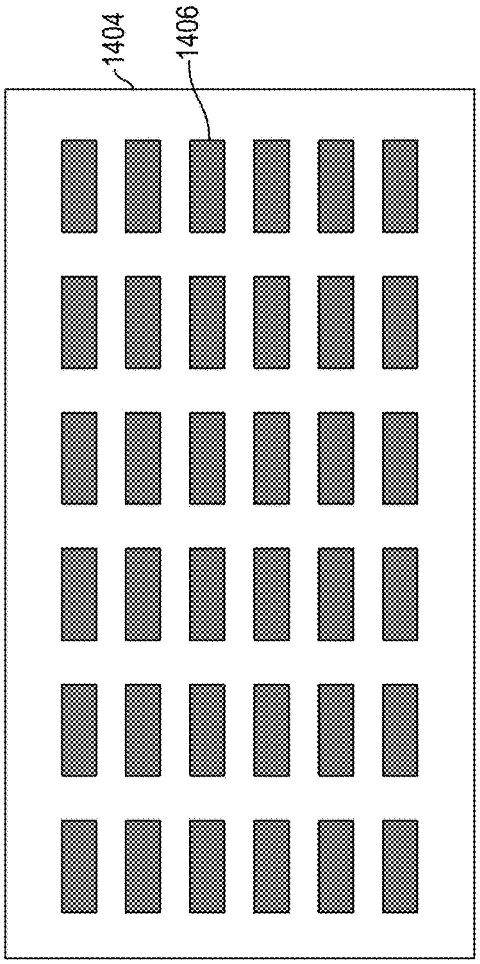
FIG. 14B FIG. 17A FIG. 17B FIG. 17C FIG. 17D FIG. 17E
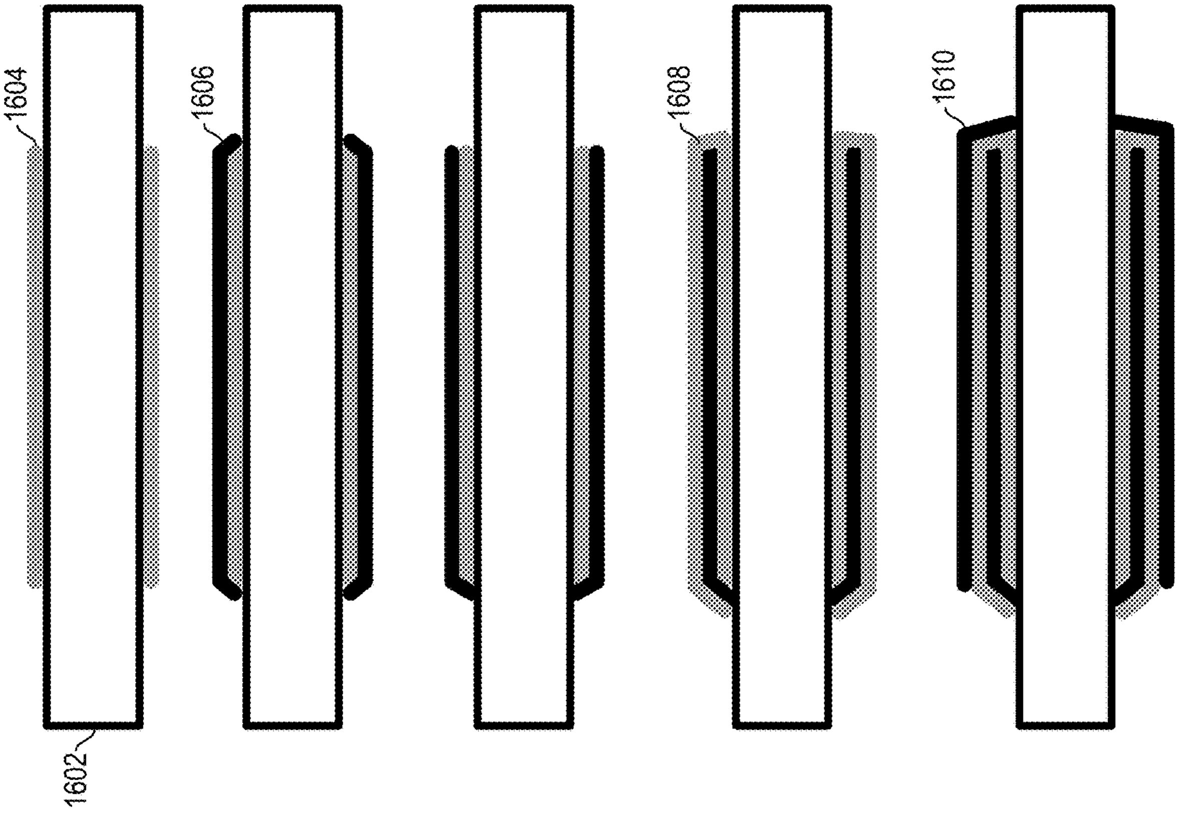
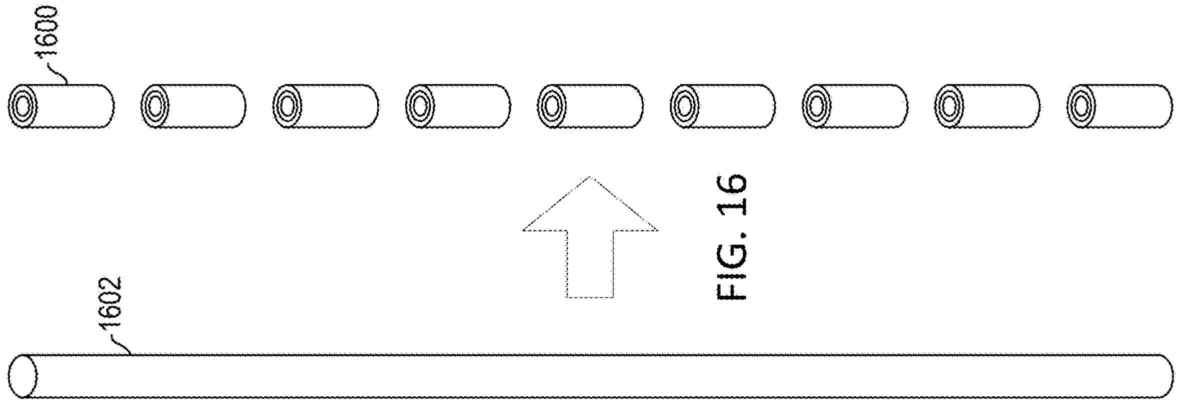
FIG. 16

ELECTRICAL INTERCONNECT WITH IMPROVED IMPEDANCE

BACKGROUND

An electrical interconnect may connect components of an electrical platform together. As one example, an interconnect may comprise one or more pins. A pin may comprise a conductive material (e.g., a metal).

BRIEF DESCRIPTION OF THE DRAWINGS

FIG. 14A illustrates a printing stencil in accordance with various embodiments.

FIG. 14B illustrates a base metal for use with the printing stencil to manufacture electrical pins in accordance with various embodiments.

FIGS. 15A-D illustrate phases of manufacture of an electrical pin in accordance with various embodiments.

FIG. 16 illustrates multiple electrical pins formed from a conductive tube in accordance with various embodiments.

FIGS. 17A-E illustrate phases of manufacture of an electrical pin in accordance with various embodiments.

Like reference numbers and designations in the various drawings indicate like elements.

DETAILED DESCRIPTION

Figure 1A:
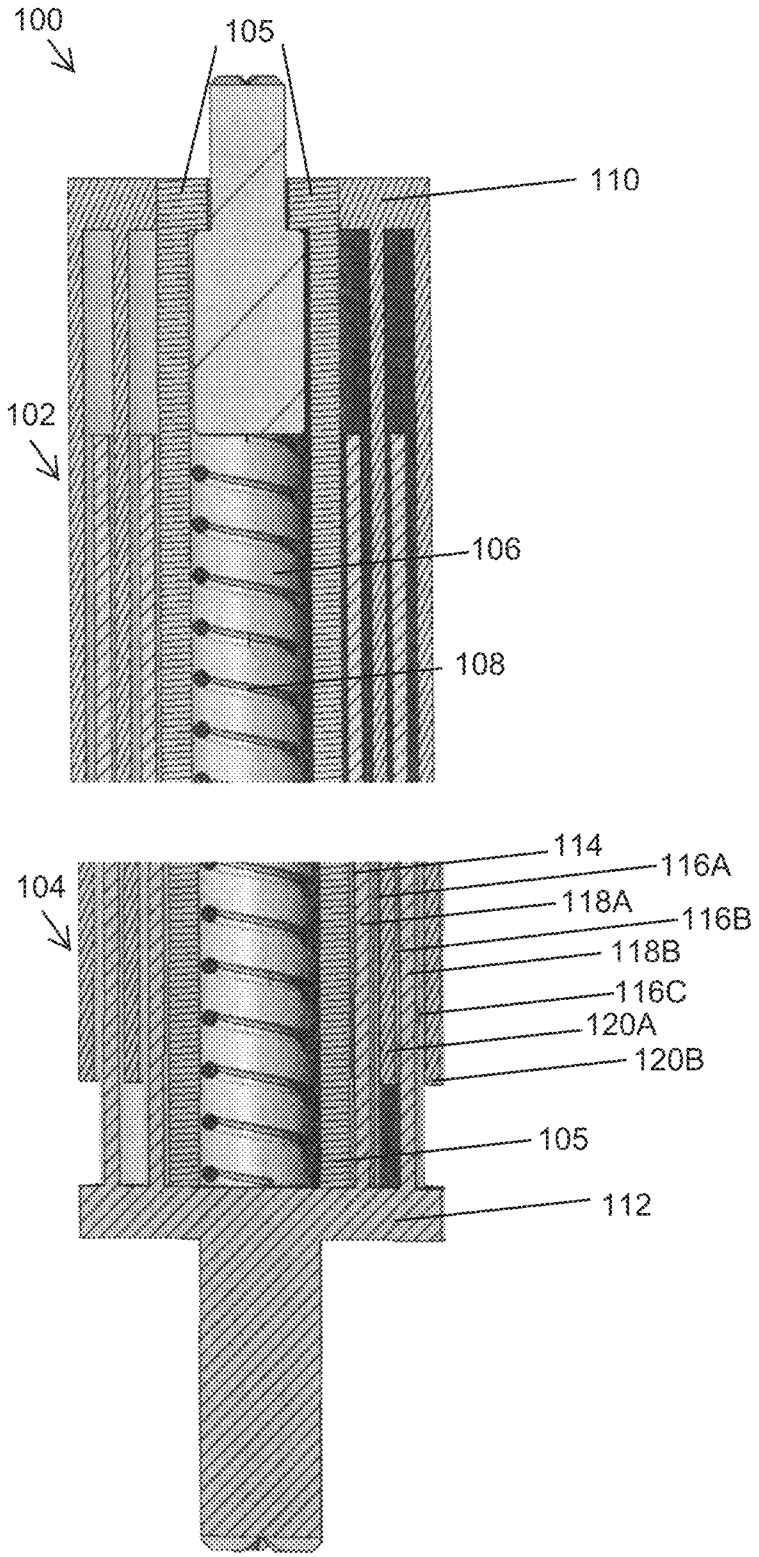
FIGS. 1A and 1B illustrate cross sections of a cylindrical electrical pin in accordance with certain embodiments.
Figure 1B:
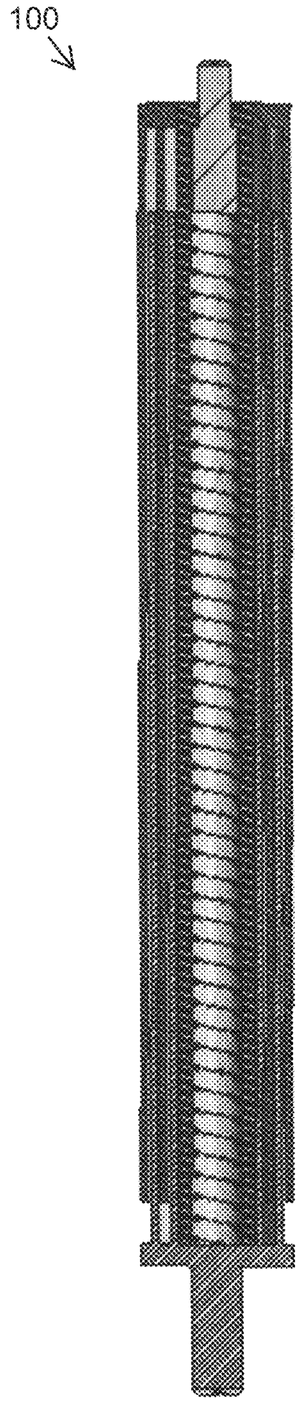
Figure 2A:
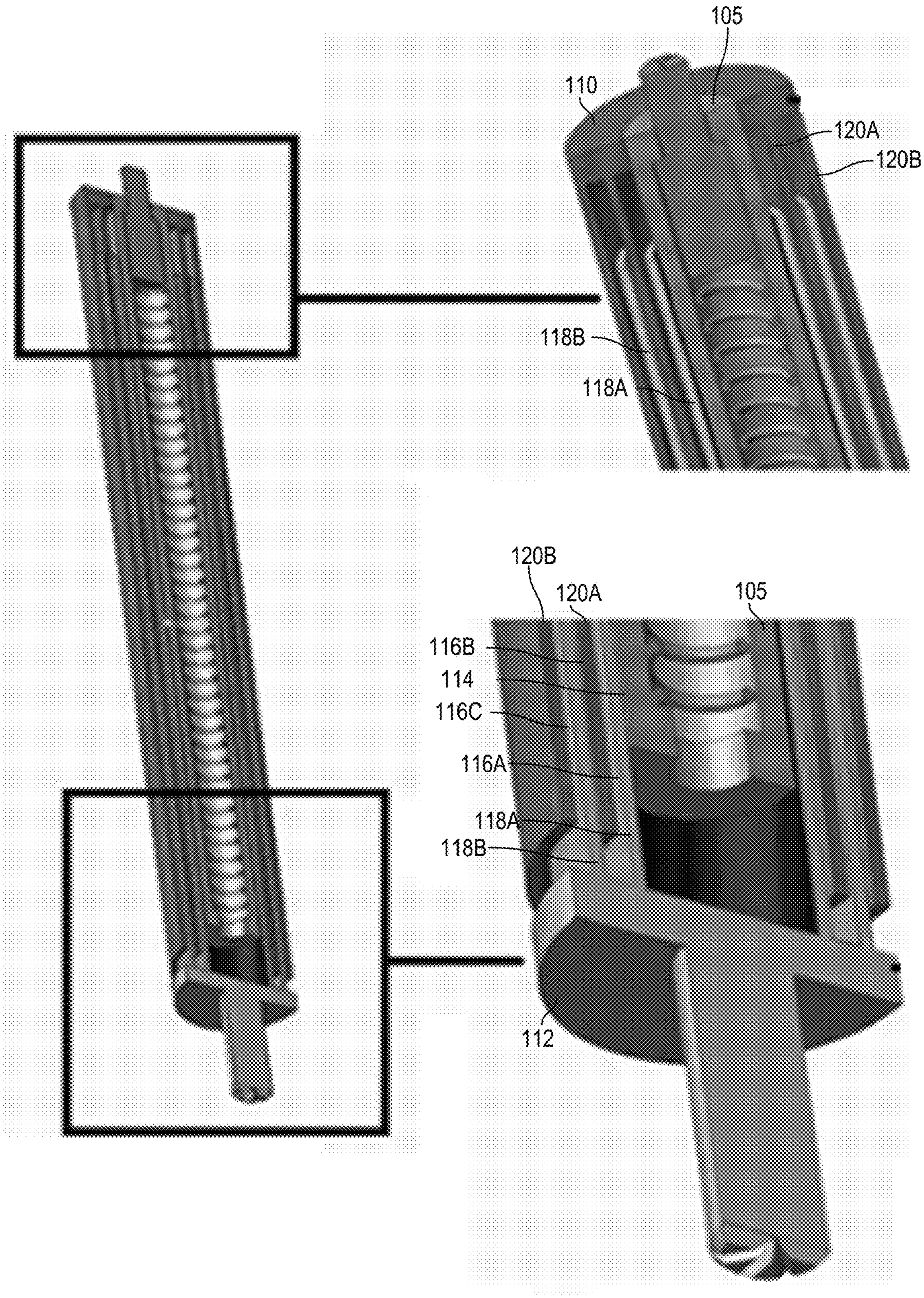
FIGS. 2A and 2B illustrate other cross sections of the cylindrical electrical pin in accordance with certain embodiments.
Figure 2B:
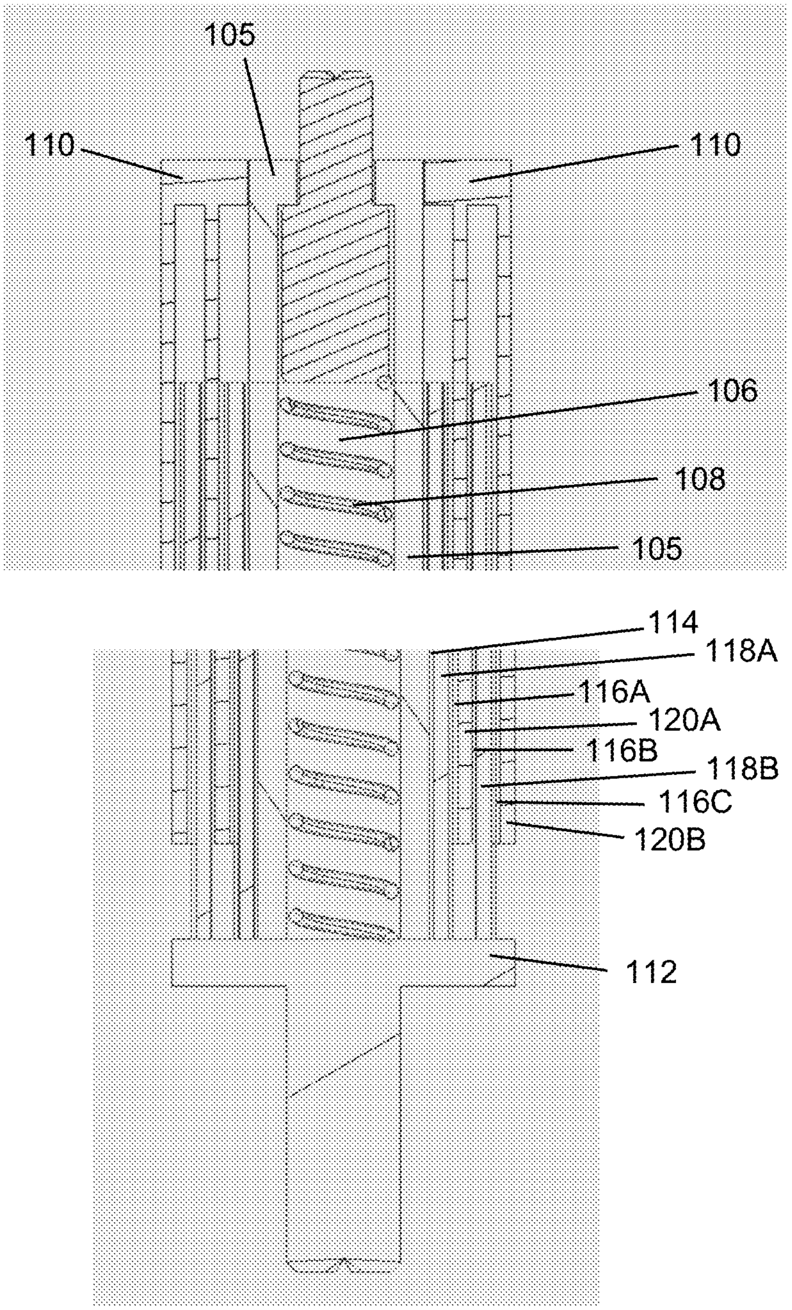

FIG. 1A illustrates a cross section of a cylindrical electrical pin 100 in accordance with certain embodiments. As the shape of the pin 100 is cylindrical (e.g., as shown better by the three dimensional cross section depicted in FIG. 2A and the plurality of pins depicted in FIG. 10), the cross section represents the cross section at the widest portion of the pin. Thus, one or more of the layers depicted may have a cylindrical shape around the center of the pin 100. FIG. 1A depicts an upper portion 102 of the pin 100 and a lower portion 104 of the pin. FIG. 1B depicts the entire pin 100. FIG. 2A provides a different three dimensional cross section of the pin 100 (showing one half of the pin). FIG. 2B illustrates yet another cross section of the pin 100 without shading for illustrative purposes.

The pin 100 comprises a conductive core 105. The conductive core 105 provides the electrical coupling between a first end (e.g., the top) of the pin 100 and a second end (e.g., the bottom) of the pin (and thus also provides the electrical coupling to conductive material coupled to the top and bottom of the pin). In the embodiment depicted, the pin 100 is a spring-loaded pin. In the embodiment depicted, the conductive core 105 encircles a void 106 in which a spring 108 is present. When the pin 100 is coupled to another conductive material, the spring 108 may be compressed to facilitate mechanical coupling with the conductive material. The pin 100 also includes a top conductive plate 110 which is connected (physically and/or electrically) with the conductive core 105.

The pin 100 also comprises various non-conductive layers (which may also be referred to as insulator layers or dielectric layers) and conductive layers that form a comb structure. Thus, the pin 100 may comprise a metallic cylindrical structure (e.g., conductive core 105) surrounded by a comb structure. In the embodiment depicted, the non-conductive layers include an inner dielectric layer 114, a first outer dielectric layer 116A, a second outer dielectric layer 116B, and a third outer dielectric layer 116C; and the conductive layers include first lower conductive layer 118A, second lower conductive layer 118B, first upper conductive layer 120A, and second upper conductive layer 120B. The lower conductive layers 118 are connected to the conductive core 105 via a bottom conductive plate 112 proximate to the lower end of the pin 100 and the upper conductive layers 120 are connected to the top conductive plate 110. The lower conductive layers 118 extend parallel to the conductive core 105 from the bottom conductive plate 112 towards the top conductive plate 110, but do not contact the top conductive plate 110 (and thus are not connected to the conductive core 105 proximate the top end of the core), where extending parallel to the conductive core 105 may encompass at least a portion (e.g., a majority) of the lower conductive layers 118 being in parallel with at least a portion (e.g., a majority) of the conductive core 105. Similarly, the upper conductive layers 120 are connected to the conductive core 105 proximate a top end of the conductive core 105 via the top conductive plate 110 and extend parallel to the conductive core 105 from the top conductive plate 110 towards the bottom conductive plate 112, but do not contact the bottom conductive plate 112, where extending parallel to the conductive core 105 may encompass at least a portion (e.g., a majority) of the upper conductive layers 120 being in parallel with at least a portion (e.g., a majority) of the conductive core 105. As depicted, the conductive layers 118 and 120 each span a majority (roughly 90% in the embodiment depicted) of the length of the conductive core 105 (though they span different sections of that length).

In various embodiments, a conductive core may be a continuous conductive structure from a first end (e.g., top or left side) of an interconnect to a second end (e.g., bottom or right side). In other embodiments, the conductive core may include two or more conductive structures that are separated (e.g., by air or a low dielectric material), but are capacitively coupled together. For example, in FIG. 2, the illustrated conductive core 105 stops short of contacting the bottom conductive plate 112, but may still be capacitively coupled to it (and thus, e.g., high speed signals may still be passed between the illustrated conductive core 105 and the bottom conductive plate 112). Thus, as a general term, the conductive core may include the illustrated conductive core 105 as well as at least a portion of the bottom conductive plate and/or the appendage extending downwards from the bottom conductive plate.

Vertical interconnects and other types of interconnects may be inductive in nature due to their relatively long physical length for mechanical stability and longer life span, which may make the interconnects susceptible to the introduction of high crosstalk to high-speed signals and high voltage fluctuation in a power delivery network.

In various embodiments of the present disclosure, an interconnect may include a comb structure that provides an additional capacitance in parallel with the core portion (e.g., conductive core 105) of the interconnect to balance the excessive inductance of the interconnect, thus improving the impedance of the interconnect. The comb structure may also form a shielded electrical pathway to reduce unwanted near end crosstalk. In various embodiments of the present disclosure, the comb structure of the interconnect allows for tuning of the impedance of the interconnect based on the design of the comb structure. As the impedance is affected by the capacitance added by the comb structure, the impedance may be tuned during the design phase based on the thickness of the non-conductive layers, the dielectric constant(s) of the non-conductive layers, the length of the conductive layers, or other suitable parameters of the interconnect. For example, the offset in length between the conductive layers and non-conductive layers can be designed properly to provide the appropriate parallel capacitance along the cores of a plurality of interconnects to form a high density and low-cost interconnect array. As another example, the comb structure may include staggered conductor layers with respect to the insulator layers.

Various embodiments of the present disclosure may provide one or more technical advantages such as reduced impedance, reduced reflection to reduce the far end crosstalk (FEXT), improved power delivery network integrity by minimizing the L/R time impact on the RC delay of the transient response, and a power delivery impedance with a lower knee frequency to reduce the impedance for a power path.

In various embodiments, the dielectric layer 114 that is used between the conductive core 105 and the first conductive layer 118A may be the same material (and have the same dielectric constant) as the other dielectric layers (e.g., 116) between the various conductive layers of the comb structure. In other embodiments, the dielectric layer 114 may be a different material (with a different dielectric constant (Dk)). For example, the dielectric layer 114 may have a low dielectric constant (or at least have a dielectric constant that is lower than the dielectric constant of the other dielectric layers 116) while the other dielectric layers (e.g., 116) have a high dielectric constant. In some embodiments, a high dielectric constant may be a dielectric constant that is greater than 4. The non-conductive layers may comprise any suitable dielectric material, such as Megtron 6, FaradFlex $MC_{25}ST$, $SrTiO_3$, FR4, or other similar material. The dielectric constant of a dielectric layer may be based on the nature of the base material.

In the embodiment depicted in FIGS. 1A, 1B, and 2, a double comb structure is shown in which the pin 100 comprises two lower conductive layers 118A and 118B and two upper conductive layers 120A and 120B placed around the conductive core 105. In another embodiment, a single comb structure may include a single conductive layer 118 and a single upper conductive layer 120. In yet other embodiments, additional lower conductive layers 118 and upper conductive layers 120 may be utilized.

Figure 3:
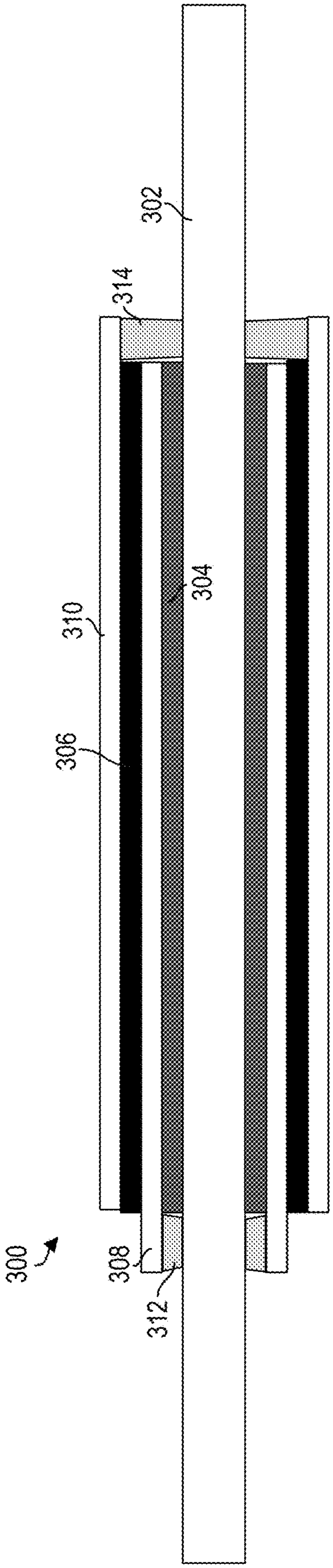
FIG. 3 illustrates a cross section of a planar pin in accordance with certain embodiments.
Figure 4:
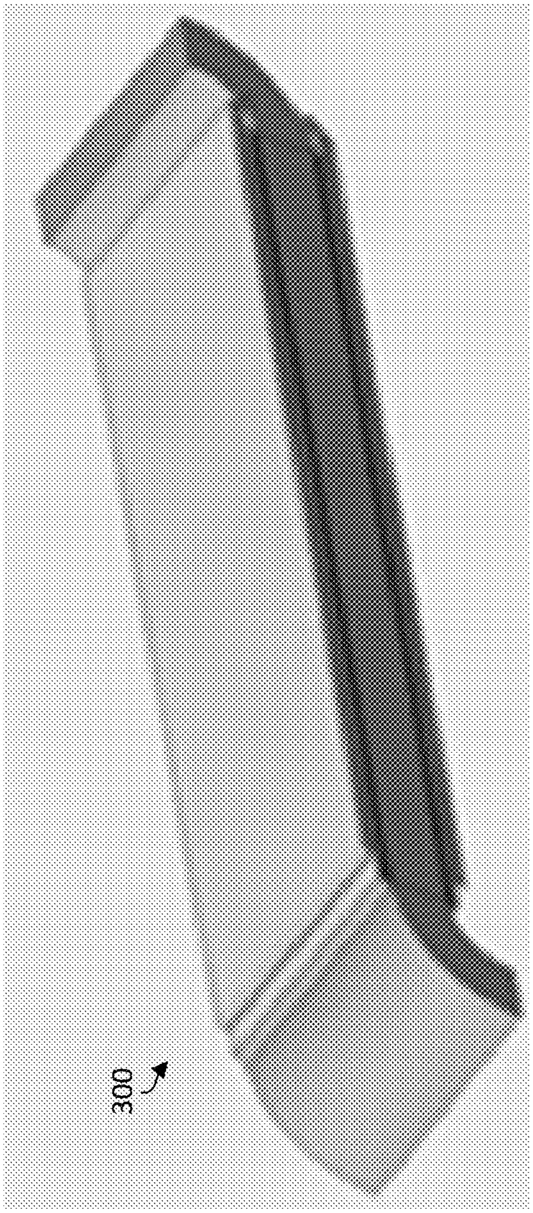
FIG. 4 illustrates a planar pin in accordance with certain embodiments.

FIG. 3 depicts a cross section of a planar pin 300 prior to a stamping operation and FIG. 4 depicts the planar pin 300 after the stamping operation. Planar pin 300 comprises a conductive core 302. Similar to the cylindrical pin 100, the planar pin 300 comprises a comb structure to introduce parallel capacitance to the conductive core 302. Above the conductive core 302, the planar pin 300 comprises a first non-conductive layer 304 and a second non-conductive layer 306, as well as a first conductive layer 308 and a second conductive layer 310. The first conductive layer 308 is connected to the conductive core 302 proximate to the left end of the conductive core 302 via conductive joint 312 and extends parallel to the conductive core 302 towards the right end of the conductive core. The second conductive layer 310 is connected to the conductive core 302 proximate to a right end of the conductive core via conductive joint 314 and extends parallel to the conductive core 302 towards the left end of the conductive core. The bottom side of the conductive core 302 is coupled to a similar set of conductive and non-conductive layers. The layers on the top of the conductive core 302 may be discrete from (e.g., not connected to) the layers on the bottom of the conductive core 302.

The portions of the conductive core that extend past the conductive layers may be stamped to form the pin tip and leg. In various embodiments, the conductive joints 312 and 314 may be formed by any suitable method, such as plating, printing, or welding. The various conductive layers may also be formed by any suitable method, such as plating or printing. In some embodiments, the conductive layers may comprise thin copper foils (or other suitable conductive material). In various embodiments, regardless of the shape of the interconnect (e.g., cylindrical, planar, etc.), the conductive layers may be thinner than the conductive core. The various conductive layers may be the same thickness or may have different thicknesses.

In various embodiments, the non-conductive layer 304 that is between the conductive core 302 and the first conductive layer 308 may be the same material (and have the same dielectric constant) as the other non-conductive layer 306 between the first and second conductive layers of the comb structure. In other embodiments, the non-conductive layer 304 may be a different material (with a different dielectric constant). For example, the non-conductive layer 304 may have a low dielectric constant (or at least have a dielectric constant that is lower than the dielectric constant of the other non-conductive layer 306) while the other non-conductive layer 306 may have a high dielectric constant.

Although the embodiment depicted has only a single conductive layer 308 connected to a first end (e.g., the left side) of the conductive core 302 and a single conductive layer 310 connected to a second end (e.g., the right side) of the conductive core (on both the top and bottom sides of the conductive core 302), in other embodiments, a pin 300 may have multiple conductive layers 308 connected to the left side of the conductive core 302 (but not connected to the right side of the conductive core 302) as well as multiple conductive layers 310 connected to the right side of the conductive core 302 (but not connected to the left side of the conductive core 302).

Although references have been made herein to the left, right, top, and bottom of the pin 300, such references may be arbitrary depending on the orientation of the pin 300. For example, although the pin 300 is depicted in a lengthwise fashion, the pin may be rotated into a vertical orientation when it is used as an interconnect.

While the FIGs. herein depict various interconnect structures and geometries, any suitable interconnects may include comb structures incorporating concepts described herein. For example, the teachings herein may be applied to any interconnects or groups of interconnects such as cylindrical pins, flat or planar pins, spiral pins, pins having other shapes, vertical connectors, co-planer connectors, interconnects to carry high-speed signals, power delivery paths, memory module interfaces (e.g., SODIMM connectors), packages, sockets, board-to-board connections (including cables), package to board connections, signal traces (e.g., PCB traces), interposer connections, or other suitable interconnects.

In a particular embodiment, an interconnect with a comb structure may be embedded within a PCB (which may have alternating conductive and non-conductive layers). For example, a comb structure as described herein may be formed on a via between layers of the PCB or on a metal layer within the PCB. Any of the teachings herein may be used to form such a comb structure. For example, the comb structure may be cylindrical in nature (e.g., similar to the way the comb structure is formed in FIGS. 1A-1B and 2A-2B, e.g., with a via functioning as the conductive core) or planar in nature (e.g., similar to the way the comb structure is formed in FIG. 3, e.g., with a metal layer or trace functioning as the conductive core). In some embodiments, 3D printing may be used to form the comb structure within the PCB.

Figure 5:
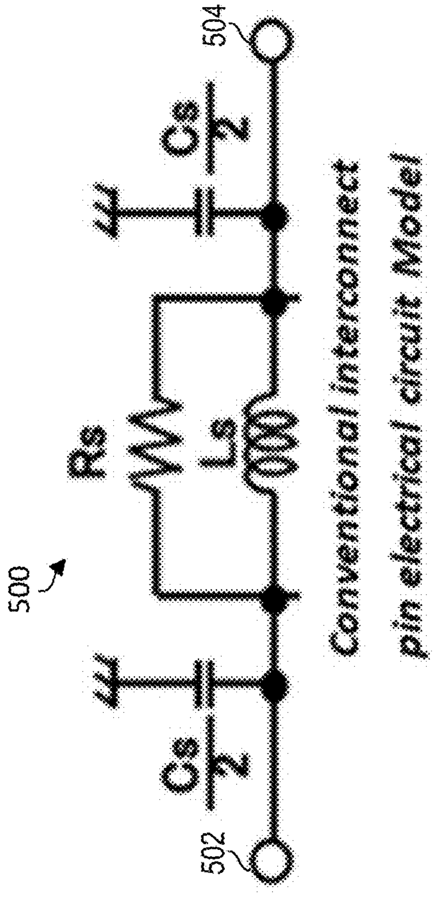
FIG. 5 illustrates an interconnect pin electrical circuit model in accordance with certain embodiments.

FIG. 5 illustrates an interconnect pin electrical circuit model 500 in accordance with certain embodiments. In the model, node 502 represents one end of the pin and node 504 represents the other end of the pin. This circuit model 500 may represent circuit characteristics of a pin without a comb structure. As depicted, the circuit model 500 includes both a shunt resistance Rs and a shunt inductance Ls as well as capacitances Cs/2.

Figure 6:
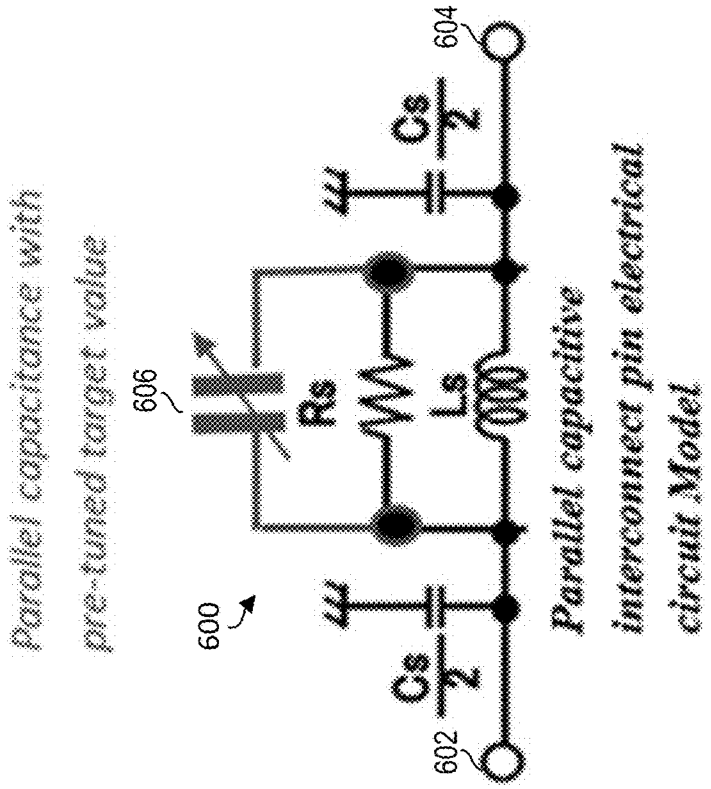
FIG. 6 illustrates a parallel capacitive interconnect pin electrical circuit model in accordance with various embodiments.

FIG. 6 illustrates a parallel capacitive interconnect pin electrical circuit model 600 in accordance with various embodiments. Circuit model 600 represents a pin with a comb structure. In the model, node 602 represents one end of the pin and node 504 represents the other end of the pin. The comb structure provides a tunable capacitance 606 in parallel to the shunt resistance Rs and inductance Ls. The tunability of capacitance 606 is accomplished through changing the shape of the comb structure or through changing the dielectric material of the insulator layers in the comb structure during the design phase. The capacitance may compensate for at least a portion of the inductance Ls, reducing the impedance of the pin.

Figure 7:
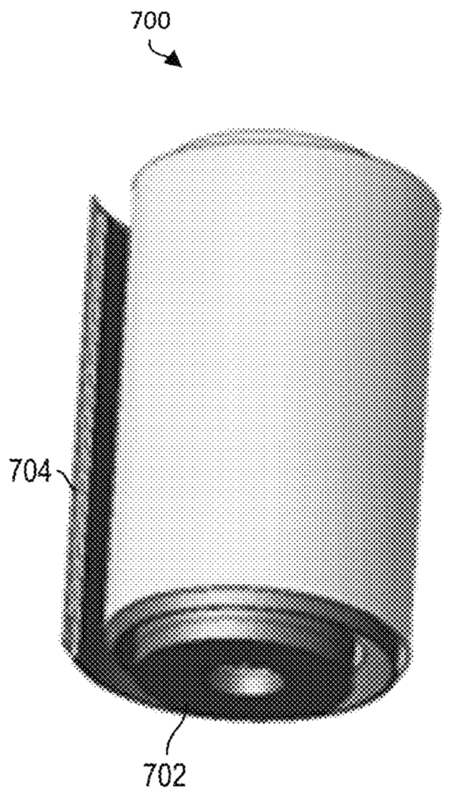
FIG. 7 illustrates a spiral electrical pin in accordance with certain embodiments.

FIG. 7 illustrates a method of manufacturing a parallel capacitive interconnect pin 700 (e.g., such as pin 100) using a spiral wrap method of sheets of material where conductive layers and non-conductive layers are layered forming a comb structure. One or more of the conductive layers 704 are connected to the top of the pin structure 702 and one or more other conductive layers of the conductive layers 704 are connected to the bottom of the pin structure 702 using a solder bonding method. The two ends connect with an inner pin structure (not shown for clarity); which is spring loaded for positive interface contact against a ball or pad. Layers 704 may introduce a parallel capacitance to the conductive core 702.

Figure 8:
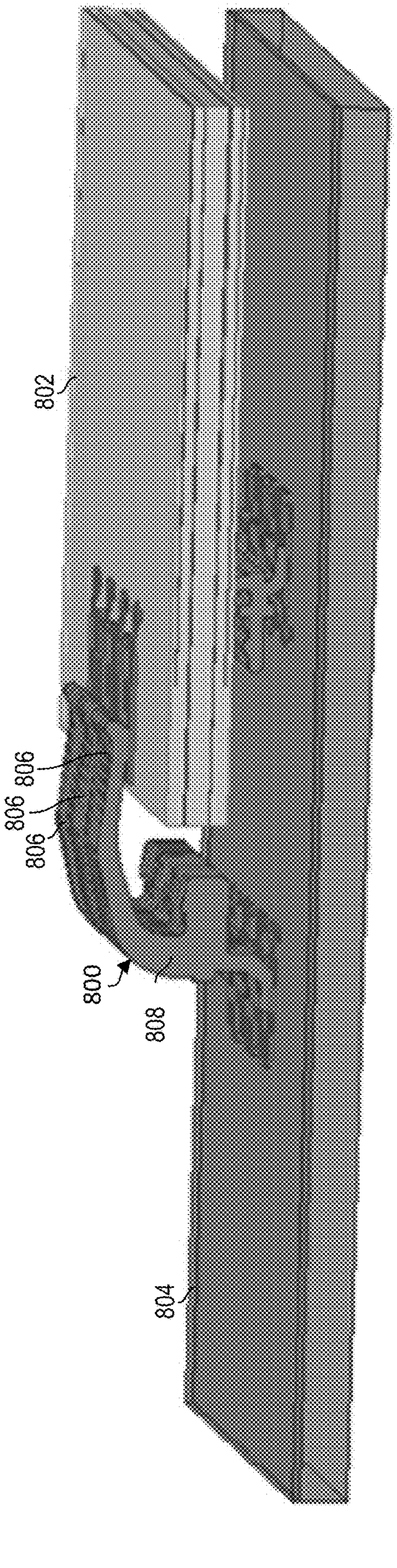
FIG. 8 illustrates a coated small outline dual in-line memory module (SODIMM) socket connector in accordance with various embodiments.

FIG. 8 illustrates a coated SODIMM socket connector 800 in accordance with various embodiments. The connector 800 may, e.g., couple a memory card 802 to a motherboard 804. The connector 800 comprises a plurality of pins 806. The pins may include comb structures (e.g., 808) that comprise dielectric layers between conductive layers. As in previous embodiments, the comb structures may include at least one conductive layer that is connected to a pin proximate a first end of a pin and extends parallel to a conductive core towards an end of the conductive core and another at least one conductive layer that is connected to the pin proximate a second end of the pin and extends parallel to the conductive core towards the other end of the conductive core.

In various embodiments, the pin impedance of the connector 800 may be well controlled, e.g., in the range of 42.5Ω to 45Ω with the comb structure, compared to a conventional SODIMM pin impedance of 51Ω to 54Ω.

Figure 10:
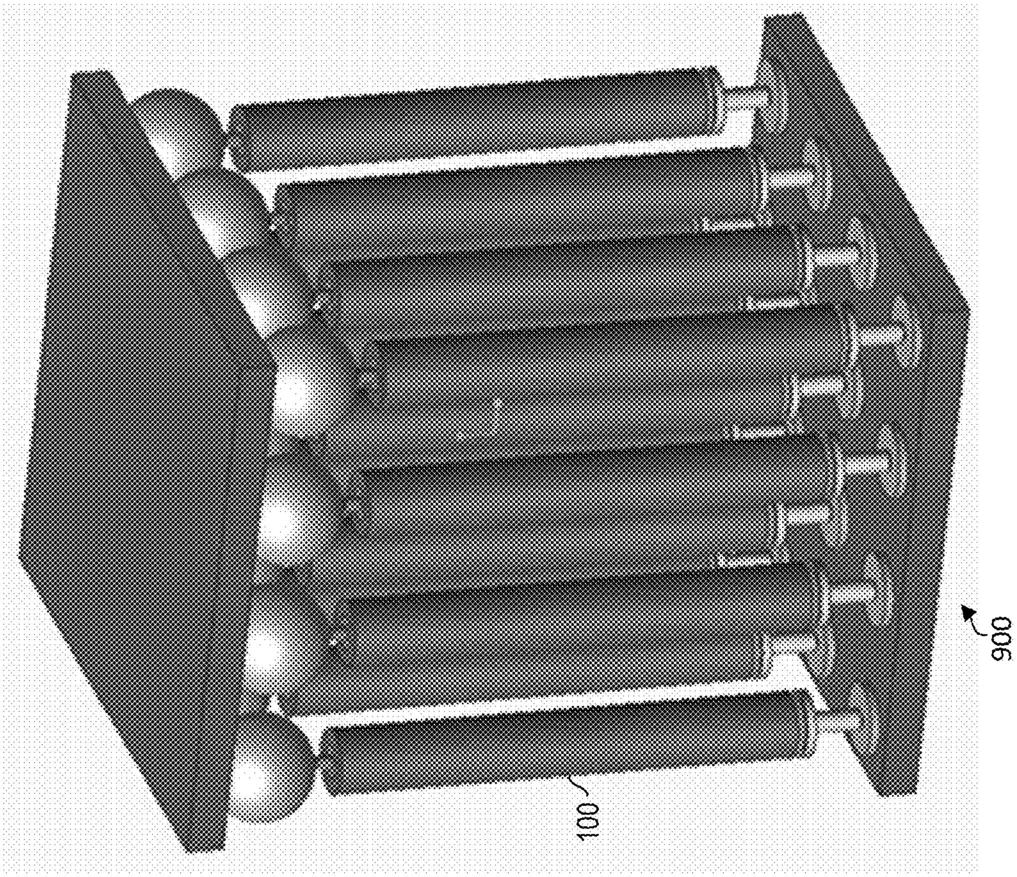
FIG. 10 illustrates cylindrical electrical pins of a socket in accordance with various embodiments.
Figure 9:
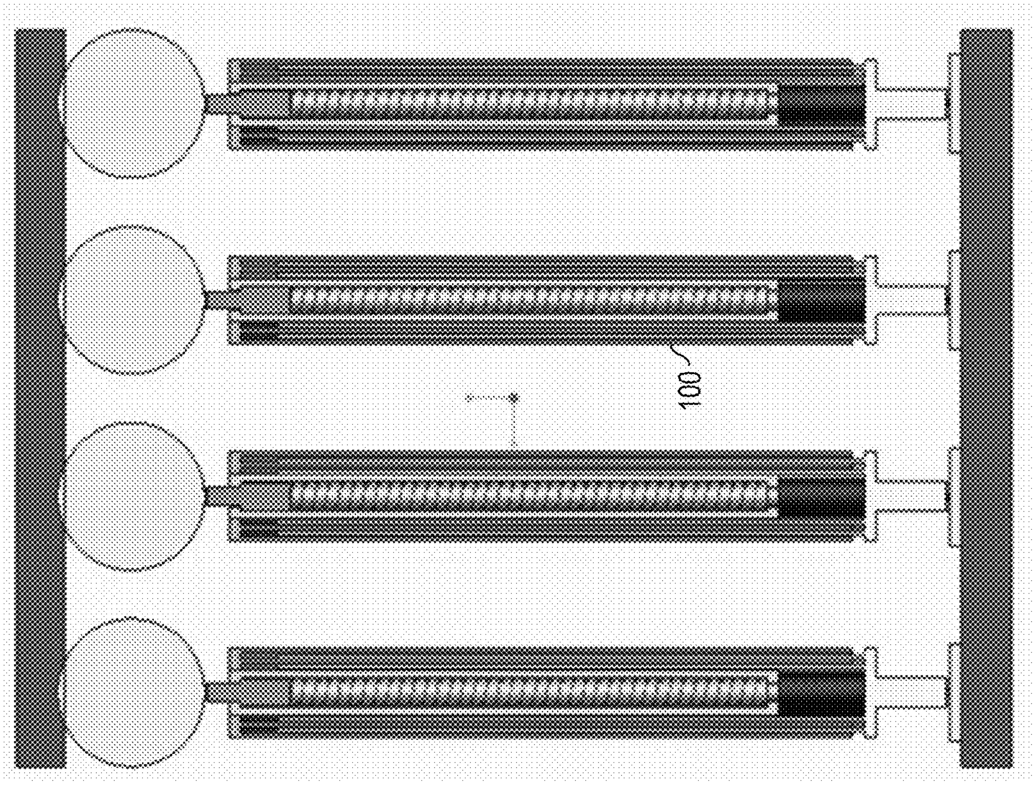
FIG. 9 illustrates a cross section of cylindrical electrical pins of a socket in accordance with various embodiments.

FIG. 9 illustrates a cross section of an array 900 of cylindrical electrical pins 100 of a socket in accordance with various embodiments. FIG. 10 illustrates a three dimensional view of the cylindrical electrical pins in accordance with various embodiments. In a conventional spring-loaded socket design, a pin may be installed in a housing with an air gap between a pin and the housing. However, in various embodiments of the present disclosure, the pins 100 may function as pseudo coaxial interconnect due to the pseudo-metal shielding provided by the comb structures. As depicted in FIG. 9 (and earlier in FIGS. 1A, 1B, and 2), the conductive core of a spring-loaded pin 100 in the center of the interconnect is installed into a layered cylindrical structure constituted of altered conductive (e.g., metallic) layers and insulated layers. Although the metal layers are not physically connected directly to both the top and bottom of the spring-loaded pin and do not make direct contact with the pads on the PCB, their presence still provides a pseudo shielding. An array of pseudo coaxial pins with top and bottom package connections is shown in FIG. 10.

Figure 11:
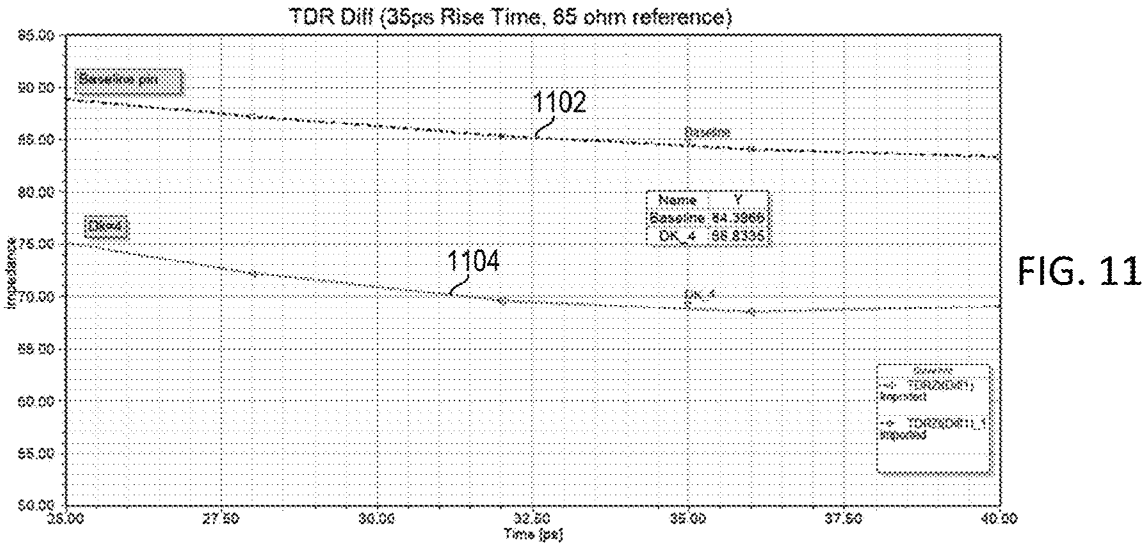
FIG. 11 illustrates a graph showing impedances of electrical pins in accordance with various embodiments.

FIG. 11 illustrates a graph showing impedances of example electrical pins in accordance with various embodiments. A first plot 1102 depicts impedances of an example baseline pin responsive to time domain reflectometer (TDR) impedance measurements and second plot 1104 depicts impedances of an example pin comprising a comb structure. The two socket pins may have the same pitch, diameter, and height. For the pin comprising the comb structure, the dielectric constant of the one or more non-conductive layers in between the conductive layers of the comb structure is Dk=4. As depicted, the pin with the comb structure has significantly lower impedance.

Figure 12:
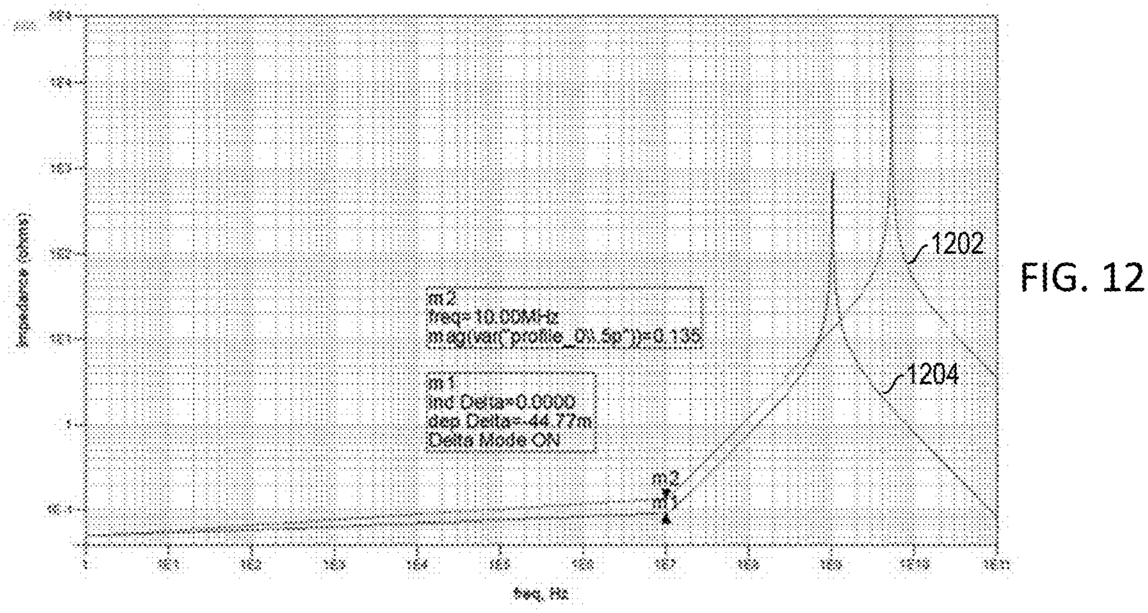
FIG. 12 illustrates a graph showing impedances of electrical pins in accordance with various embodiments.

FIG. 12 illustrates a graph showing impedances of example electrical pins at different frequencies in accordance with various embodiments. A first plot 1202 depicts impedances of an example baseline pin and a second plot 1204 depicts impedances of an example pin comprising a comb structure. The controllable impedance offered by the comb structure may provide benefits for a power delivery network through lowering the impedance. As shown in FIG. 12, for the same pin design (e.g., 3.6 mm long and 0.45 mm pitch), the pin with the comb structure offers much lower peak impedance compared to the baseline pin. The lower impedance results in a lower voltage fluctuation.

Figure 13:
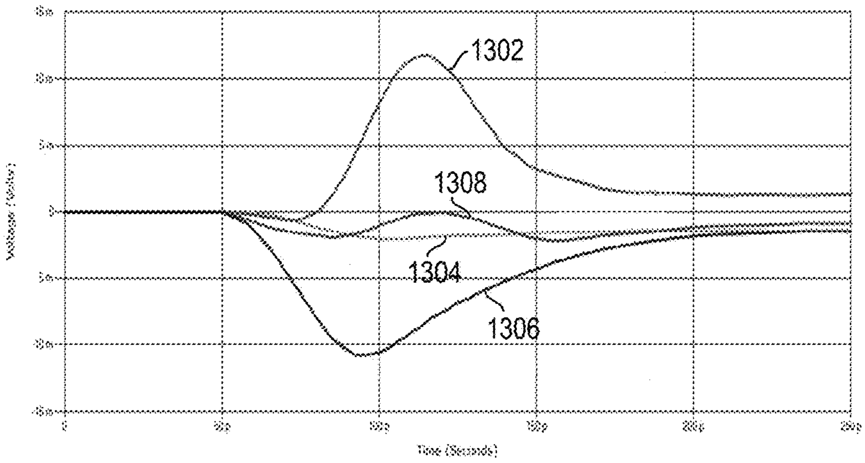
FIG. 13 illustrates a graph showing far end crosstalk of electrical pins in accordance with various embodiments.

FIG. 13 illustrates a graph showing simulated far end crosstalk of example electrical pins in accordance with various embodiments. The graphs compare the far end crosstalk (FEXT) experienced by a high-speed signal for various pin designs with the same pin pitch, but different pin diameters and heights. Plot 1302 represents a pin having a height of 3.6 mm and a diameter of 0.32 mm. Plot 1304 represents a pin having a height of 2 mm and a diameter of 0.3 mm. Plot 1306 represents a pin having a height of 3.6 mm and a diameter of 0.25 mm. Plots 1302, 1304, and 1306 correspond to pins that do not have a comb structure. Plot 1308 represents a pin having a height of 3.6 mm and a diameter of 0.25 mm (similar to plot 1306), but also having a comb structure. As illustrated, the pseudo-coaxial pin (provided by the comb structures) represented by plot 1308 introduces much less FEXT to a high-speed signal.

FIG. 14A illustrates a printing stencil 1400 in accordance with various embodiments. In various embodiments, the printing stencil 1400 may be used during the manufacture of a planar pin (e.g., 300) with a comb structure. The printing stencil may include a solid material with a plurality of apertures 1402 (shown as rectangular, in other embodiments the apertures may have different shapes).

FIG. 14B illustrates a metal sheet 1404 and a plurality of pin sites 1406 on the metal sheet 1404 (where a pin site corresponds to a pin to be manufactured on the metal sheet). During manufacturing, the stencil 1400 may be placed over the metal sheet 1404, and the appropriate material (e.g., a conductive material or non-conductive material) is applied (e.g., via spraying or other deposition method). The stencil may be shifted in between application of conductive or non-conductive layers to form a comb structure. In some embodiments, a single stencil may be used for all layer prints by shifting the base material sheet registering.

Thus, the metal sheet 1404 may be used as a base material with pre-coated conductive and high Dk nonconductive layers to form flat comb structures for achieving desired shunt capacitance and lowering the impedance of designated stamped pins. Each conductive layer has an alternate intrusive length exceeding the length of the high Dk non-conductive layers to allow for bonding onto a respective end of the designed stamp pin ends (to form the comb structure).

FIGS. 15A-D illustrate phases of manufacture of an electrical pin in accordance with various embodiments. The phases represent the layers applied at a pin site (e.g., 1406). The base metal may function as the conductor core 1500. In the phase of FIG. 15A, the stencil may be aligned with the metal sheet and a non-conductive layer 1502 is applied through a stencil aperture 1402.

In the phase of FIG. 15B, the stencil is shifted and a conductive layer 1504 is applied through the aperture 1402 (with an intentional intrusion length and droop on the right side to connect the layer to one side of the conductor core 1500).

In the phase of FIG. 15C, the stencil is shifted again and an additional non-conductive layer 1506 is applied through the aperture. In the phase of FIG. 15D, the stencil is shifted again and an additional conductive layer 1508 is applied through the aperture (with an intentional intrusion length and droop on the left side to connect the layer to the other side of the conductor core 1500).

In some embodiments, the joints connecting the conductor core 1500 to the respective conductive layers may be laser welded to ensure appropriate connectivity. The base metal may then be stamped into an individual pin.

FIG. 16 illustrates multiple electrical pins 1600 formed from a conductive tube 1602 in accordance with various embodiments. An electrical pin 1600 may be a cylindrical pin, such as pin 100.

FIGS. 17A-17E depict phases of manufacture of a cylindrical pin (e.g., 1600), which may be a spring probe pin in some embodiments. The conductive tube 1602 may be used as a base material and may function as the conductive core. The comb structure may be manufactured by coating, plating, or otherwise applying non-conductive and conductive layers over the conductive tube 1602 to achieve a desired amount of shunt capacitance and lower the impedance of the pin 1600. In some embodiments, the tube 1602 is spun as each non-conductive and conductive layer is applied. Each conductive layer has an alternate intrusive length exceeding the length of the high Dk non-conductive layers to allow bonding onto one of the ends of the conductive tube 1602.

In the phase of FIG. 17A, a non-conductive layer 1604 is applied around the perimeter of the to the conductive tube 1602. In the phase of FIG. 17B, a conductive layer 1606 is applied over the non-conductive layer 1604.

In the phase of FIG. 17C, the conductive coating on one end (the right side) is stripped (e.g., via metal laser trimming). This ensures that only one end (on the right side) of the conductive tube 1602 is directly connected to the conductive layer 1606.

In the phase of FIG. 17D, a second non-conductive layer 1608 is applied over the conductive layer 1606 (and around the portion of the conductive layer that was trimmed). In the phase of FIG. 17E, a second conductive layer 1610 is applied over the second non-conductive layer 1608 to complete the comb structure, in which the first conductive layer is connected to the left side of the conductive tube 1602 and the second conductive layer is connected to the right side of the conductive tube 1602.

Figure 18:
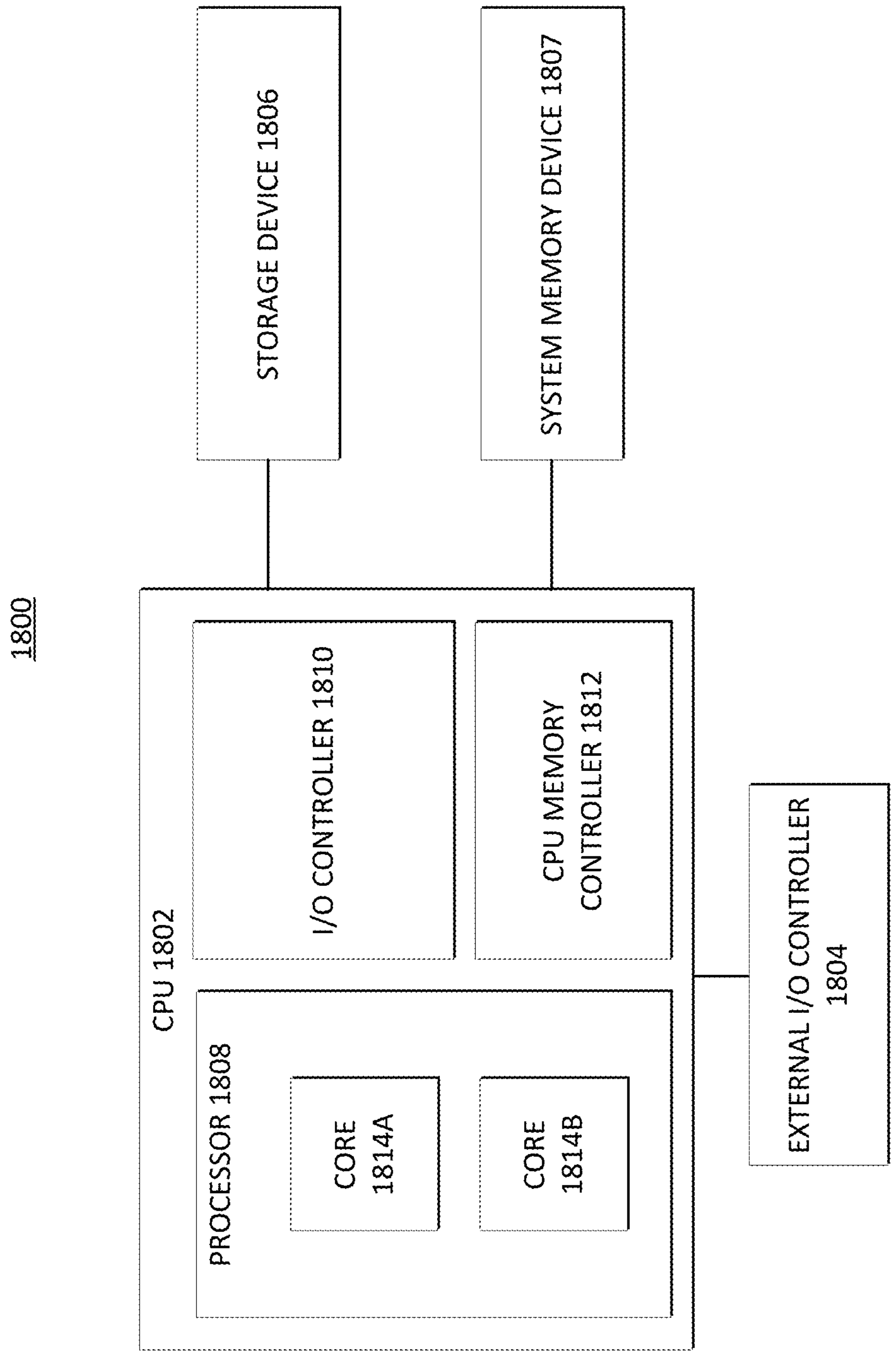
FIG. 18 illustrates an example computer system in accordance with certain embodiments.
Figure 19:
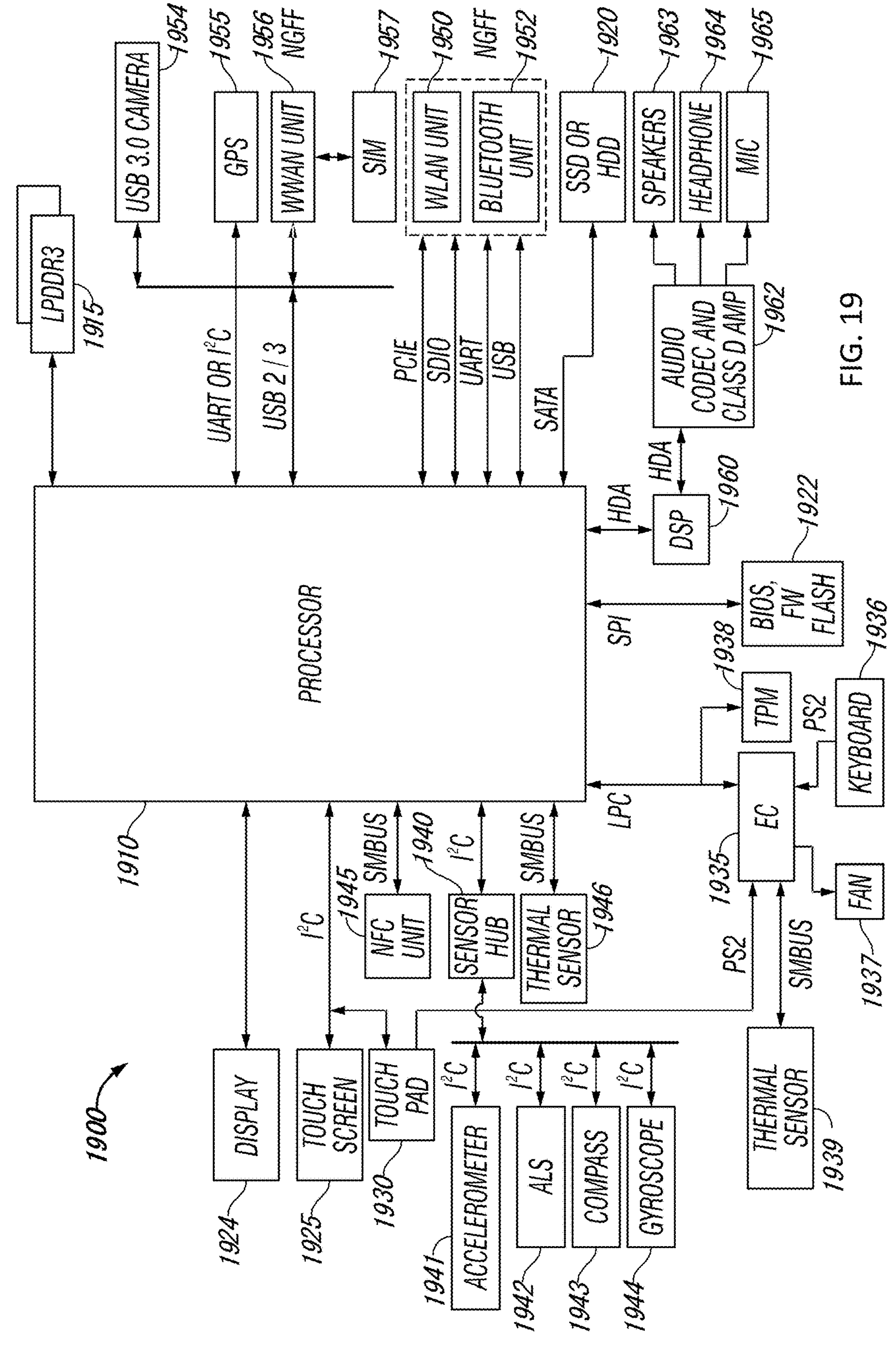
FIG. 19 illustrates a block diagram of components present in a computing system in accordance with various embodiments.
Figure 20:
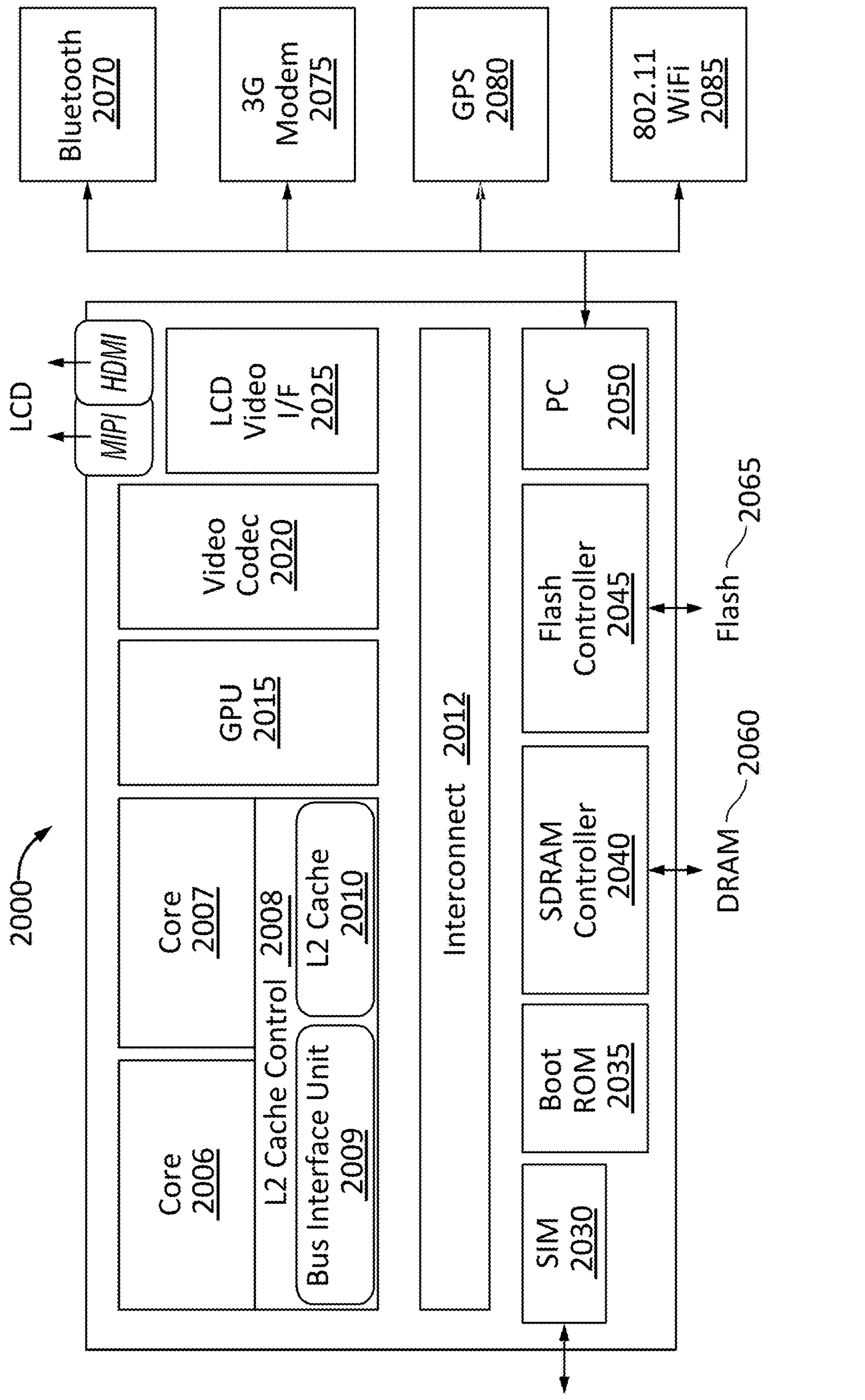
FIG. 20 illustrates a block diagram of another computing system in accordance with various embodiments.

FIGS. 18-20 depict example systems in which various embodiments described herein may be implemented. For example, any of the components of the systems depicted or interconnect between any of these components may implement a comb structure or other features described herein.

FIG. 18 illustrates components of a computer system 1800 in accordance with certain embodiments. System 1800 includes a central processing unit (CPU) 1802 coupled to an external input/output (I/O) controller 1804, a storage device 1806 such as a solid state drive (SSD) or a dual inline memory module (DIMM), and system memory device 1807. During operation, data may be transferred between a storage device 1806 and/or system memory device 1807 and the CPU 1802. In various embodiments, particular memory access operations (e.g., read and write operations) involving a storage device 1806 or system memory device 1807 may be issued by an operating system and/or other software applications executed by processor 1808.

CPU 1802 comprises a processor 1808, such as a microprocessor, an embedded processor, a digital signal processor (DSP), a network processor, a handheld processor, an application processor, a co-processor, an SOC, or other device to execute code (e.g., software instructions). Processor 1808, in the depicted embodiment, includes two processing elements (cores 1814A and 1814B in the depicted embodiment), which may include asymmetric processing elements or symmetric processing elements. However, a processor may include any number of processing elements that may be symmetric or asymmetric. CPU 1802 may be referred to herein as a host computing device (though a host computing device may be any suitable computing device operable to issue memory access commands to a storage device 1806).

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core 1814 (e.g., 1814A or 1814B) may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

In various embodiments, the processing elements may also include one or more arithmetic logic units (ALUs), floating point units (FPUs), caches, instruction pipelines, interrupt handling hardware, registers, or other hardware to facilitate the operations of the processing elements.

In some embodiments, processor 1808 may comprise a processor unit, such as a processor core, graphics processing unit, hardware accelerator, field programmable gate array, neural network processing unit, artificial intelligence processing unit, inference engine, data processing unit, or infrastructure processing unit.

I/O controller 1810 is an integrated I/O controller that includes logic for communicating data between CPU 1802 and I/O devices. In other embodiments, the I/O controller 1810 may be on a different chip from the CPU 1802. I/O devices may refer to any suitable devices capable of transferring data to and/or receiving data from an electronic system, such as CPU 1802. For example, an I/O device may comprise an audio/video (A/V) device controller such as a graphics accelerator or audio controller; a data storage device controller, such as a flash memory device, magnetic storage disk, or optical storage disk controller; a wireless transceiver; a network processor; a network interface controller; or a controller for another input device such as a monitor, printer, mouse, keyboard, or scanner; or other suitable device. In a particular embodiment, an I/O device may comprise a storage device 1806 coupled to the CPU 1802 through I/O controller 1810.

An I/O device may communicate with the I/O controller 1810 of the CPU 1802 using any suitable signaling protocol, such as peripheral component interconnect (PCI), PCI Express (PCIe), Universal Serial Bus (USB), Serial Attached SCSI (SAS), Serial ATA (SATA), Fibre Channel (FC), IEEE 802.3, IEEE 802.11, or other current or future signaling protocol. In particular embodiments, I/O controller 1810 and an associated I/O device may communicate data and commands in accordance with a logical device interface specification such as Non-Volatile Memory Express (NVMe) (e.g., as described by one or more of the specifications available at www.nvmexpress.org/specifications/) or Advanced Host Controller Interface (AHCI) (e.g., as described by one or more AHCI specifications such as Serial ATA AHCI: Specification, Rev. 1.3.1 available at http://www.intel.com/content/www/us/en/io/serial-ata/serial-ata-ahci-spec-rev1-3-1.html). In various embodiments, I/O devices coupled to the I/O controller 1810 may be located off-chip (e.g., not on the same chip as CPU 1802) or may be integrated on the same chip as the CPU 1802.

CPU memory controller 1812 is an integrated memory controller that controls the flow of data going to and from one or more system memory devices 1807. CPU memory controller 1812 may include logic operable to read from a system memory device 1807, write to a system memory device 1807, or to request other operations from a system memory device 1807. In various embodiments, CPU memory controller 1812 may receive write requests from cores 1814 and/or I/O controller 1810 and may provide data specified in these requests to a system memory device 1807 for storage therein. CPU memory controller 1812 may also read data from a system memory device 1807 and provide the read data to I/O controller 1810 or a core 1814. During operation, CPU memory controller 1812 may issue commands including one or more addresses of the system memory device 1807 in order to read data from or write data to memory (or to perform other operations). In some embodiments, CPU memory controller 1812 may be implemented on the same chip as CPU 1802, whereas in other embodiments, CPU memory controller 1812 may be implemented on a different chip than that of CPU 1802. I/O controller 1810 may perform similar operations with respect to one or more storage devices 1806.

The CPU 1802 may also be coupled to one or more other I/O devices through external I/O controller 1804. In a particular embodiment, external I/O controller 1804 may couple a storage device 1806 to the CPU 1802. External I/O controller 1804 may include logic to manage the flow of data between one or more CPUs 1802 and I/O devices. In particular embodiments, external I/O controller 1804 is located on a motherboard along with the CPU 1802. The external I/O controller 1804 may exchange information with components of CPU 1802 using point-to-point or other interfaces.

A system memory device 1807 may store any suitable data, such as data used by processor 1808 to provide the functionality of computer system 1800. For example, data associated with programs that are executed or files accessed by cores 1814 may be stored in system memory device 1807. Thus, a system memory device 1807 may include a system memory that stores data and/or sequences of instructions that are executed or otherwise used by the cores 1814. In various embodiments, a system memory device 1807 may store temporary data, persistent data (e.g., a user's files or instruction sequences) that maintains its state even after power to the system memory device 1807 is removed, or a combination thereof. A system memory device 1807 may be dedicated to a particular CPU 1802 or shared with other devices (e.g., one or more other processors or other devices) of computer system 1800.

In various embodiments, a system memory device 1807 may include a memory comprising any number of memory partitions, a memory device controller, and other supporting logic (not shown). A memory partition may include non-volatile memory and/or volatile memory.

Non-volatile memory is a storage medium that does not require power to maintain the state of data stored by the medium, thus non-volatile memory may have a determinate state even if power is interrupted to the device housing the memory. Nonlimiting examples of nonvolatile memory may include any or a combination of: 3D crosspoint memory, phase change memory (e.g., memory that uses a chalcogenide glass phase change material in the memory cells), ferroelectric memory, silicon-oxide-nitride-oxide-silicon (SONOS) memory, polymer memory (e.g., ferroelectric polymer memory), ferroelectric transistor random access memory (Fe-TRAM) ovonic memory, anti-ferroelectric memory, nanowire memory, electrically erasable programmable read-only memory (EEPROM), a memristor, single or multi-level phase change memory (PCM), Spin Hall Effect Magnetic RAM (SHE-MRAM), and Spin Transfer Torque Magnetic RAM (STTRAM), a resistive memory, magnetoresistive random access memory (MRAM) memory that incorporates memristor technology, resistive memory including the metal oxide base, the oxygen vacancy base and the conductive bridge Random Access Memory (CB-RAM), a spintronic magnetic junction memory based device, a magnetic tunneling junction (MTJ) based device, a DW (Domain Wall) and SOT (Spin Orbit Transfer) based device, a thiristor based memory device, or a combination of any of the above, or other memory.

Volatile memory is a storage medium that requires power to maintain the state of data stored by the medium (thus volatile memory is memory whose state (and therefore the data stored on it) is indeterminate if power is interrupted to the device housing the memory). Dynamic volatile memory requires refreshing the data stored in the device to maintain state. One example of dynamic volatile memory includes DRAM (dynamic random access memory), or some variant such as synchronous DRAM (SDRAM). A memory subsystem as described herein may be compatible with a number of memory technologies, such as DDR3 (double data rate version 3, original release by JEDEC (Joint Electronic Device Engineering Council) on Jun. 27, 2007, currently on release 21), DDR4 (DDR version 4, JESD79-4 initial specification published in September 2012 by JEDEC), DDR4E (DDR version 4, extended, currently in discussion by JEDEC), LPDDR3 (low power DDR version 3, JESD209-3B, August 2013 by JEDEC), LPDDR4 (LOW POWER DOUBLE DATA RATE (LPDDR) version 4, JESD209-4, originally published by JEDEC in August 2014), WIO2 (Wide I/O 2 (WideIO2), JESD229-2, originally published by JEDEC in August 2014), HBM (HIGH BANDWIDTH MEMORY DRAM, JESD235, originally published by JEDEC in October 2013), DDR5 (DDR version 5, currently in discussion by JEDEC), LPDDR5, originally published by JEDEC in January 2020, HBM2 (HBM version 2), originally published by JEDEC in January 2020, or others or combinations of memory technologies, and technologies based on derivatives or extensions of such specifications.

A storage device 1806 may store any suitable data, such as data used by processor 1808 to provide functionality of computer system 1800. For example, data associated with programs that are executed or files accessed by cores 1814A and 1814B may be stored in storage device 1806. Thus, in some embodiments, a storage device 1806 may store data and/or sequences of instructions that are executed or otherwise used by the cores 1814A and 1814B. In various embodiments, a storage device 1806 may store persistent data (e.g., a user's files or software application code) that maintains its state even after power to the storage device 1806 is removed. A storage device 1806 may be dedicated to CPU 1802 or shared with other devices (e.g., another CPU or other device) of computer system 1800.

In various embodiments, storage device 1806 may comprise a disk drive (e.g., a solid state drive); a memory card; a Universal Serial Bus (USB) drive; a Dual In-line Memory Module (DIMM), such as a Non-Volatile DIMM (NVDIMM); storage integrated within a device such as a smartphone, camera, or media player; or other suitable mass storage device.

In a particular embodiment, a semiconductor chip may be embodied in a semiconductor package. In various embodiments, a semiconductor package may comprise a casing comprising one or more semiconductor chips (also referred to as dies). A package may also comprise contact pins or leads used to connect to external circuits.

In some embodiments, all or some of the elements of system 1800 are resident on (or coupled to) the same circuit board (e.g., a motherboard). In various embodiments, any suitable partitioning between the elements may exist. For example, the elements depicted in CPU 1802 may be located on a single die (e.g., on-chip) or package or any of the elements of CPU 1802 may be located off-chip or off-package. Similarly, the elements depicted in storage device 1806 may be located on a single chip or on multiple chips. In various embodiments, a storage device 1806 and a computing host (e.g., CPU 1802) may be located on the same circuit board or on the same device and in other embodiments the storage device 1806 and the computing host may be located on different circuit boards or devices.

The components of system 1800 may be coupled together in any suitable manner. For example, a bus may couple any of the components together. A bus may include any known interconnect, such as a multi-drop bus, a mesh interconnect, a ring interconnect, a point-to-point interconnect, a serial interconnect, a parallel bus, a coherent (e.g. cache coherent) bus, a layered protocol architecture, a differential bus, and a Gunning transceiver logic (GTL) bus. In various embodiments, an integrated I/O subsystem includes point-to-point multiplexing logic between various components of system 1800, such as cores 1814, one or more CPU memory controllers 1812, I/O controller 1810, integrated I/O devices, direct memory access (DMA) logic (not shown), etc. In various embodiments, components of computer system 1800 may be coupled together through one or more networks comprising any number of intervening network nodes, such as routers, switches, or other computing devices. For example, a computing host (e.g., CPU 1802) and the storage device 1806 may be communicably coupled through a network.

Although not depicted, system 1800 may use a battery and/or power supply outlet connector and associated system to receive power, a display to output data provided by CPU 1802, or a network interface allowing the CPU 1802 to communicate over a network. In various embodiments, the battery, power supply outlet connector, display, and/or network interface may be communicatively coupled to CPU 1802. Other sources of power can be used such as renewable energy (e.g., solar power or motion based power).

Referring now to FIG. 19, a block diagram of components present in a computer system that may function as either a host device or a peripheral device (or which may include both a host device and one or more peripheral devices) in accordance with certain embodiments is described. As shown in FIG. 19, system 1900 includes any combination of components. These components may be implemented as ICs, portions thereof, discrete electronic devices, or other modules, logic, hardware, software, firmware, or a combination thereof adapted in a computer system, or as components otherwise incorporated within a chassis of the computer system. Note also that the block diagram of FIG. 19 is intended to show a high level view of many components of the computer system. However, it is to be understood that some of the components shown may be omitted, additional components may be present, and different arrangement of the components shown may occur in other implementations. As a result, the disclosure described above may be implemented in any portion of one or more of the interconnects illustrated or described below.

As seen in FIG. 19, a processor 1910, in one embodiment, includes a microprocessor, multi-core processor, multithreaded processor, an ultra low voltage processor, an embedded processor, or other known processing element. In the illustrated implementation, processor 1910 acts as a main processing unit and central hub for communication with many of the various components of the system 1900. As one example, processor 1910 is implemented as a system on a chip (SoC). As a specific illustrative example, processor 1910 includes an Intel® Architecture Core™-based processor such as an i3, i5, i7 or another such processor available from Intel Corporation, Santa Clara, CA. However, other low power processors such as those available from Advanced Micro Devices, Inc. (AMD) of Sunnyvale, CA, a MIPS-based design from MIPS Technologies, Inc. of Sunnyvale, CA, an ARM-based design licensed from ARM Holdings, Ltd. or customer thereof, or their licensees or adopters may instead be present in other embodiments such as an Apple A5/A6 processor, a Qualcomm Snapdragon processor, or TI OMAP processor. Note that many of the customer versions of such processors are modified and varied; however, they may support or recognize a specific instructions set that performs defined algorithms as set forth by the processor licensor. Here, the microarchitecture implementation may vary, but the architectural function of the processor is usually consistent. Certain details regarding the architecture and operation of processor 1910 in one implementation will be discussed further below to provide an illustrative example.

Processor 1910, in one embodiment, communicates with a system memory 1915. As an illustrative example, which in an embodiment can be implemented via multiple memory devices to provide for a given amount of system memory. As examples, the memory can be in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard to be referred to as LPDDR3 or LPDDR4 that will offer extensions to LPDDR2 to increase bandwidth. In various implementations the individual memory devices may be of different package types such as single die package (SDP), dual die package (DDP) or quad die package (QDP). These devices, in some embodiments, are directly soldered onto a motherboard to provide a lower profile solution, while in other embodiments the devices are configured as one or more memory modules that in turn couple to the motherboard by a given connector. And of course, other memory implementations are possible such as other types of memory modules, e.g., dual inline memory modules (DIMMs) of different varieties including but not limited to microDIMMs, MiniDIMMs. In a particular illustrative embodiment, memory is sized between 2 GB and 16 GB, and may be configured as a DDR3LM package or an LPDDR2 or LPDDR3 memory that is soldered onto a motherboard via a ball grid array (BGA).

To provide for persistent storage of information such as data, applications, one or more operating systems and so forth, a mass storage 1920 may also couple to processor 1910. In various embodiments, to enable a thinner and lighter system design as well as to improve system responsiveness, this mass storage may be implemented via a SSD. However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 19, a flash device 1922 may be coupled to processor 1910, e.g., via a serial peripheral interface (SPI). This flash device may provide for non-volatile storage of system software, including a basic input/output software (BIOS) as well as other firmware of the system.

In various embodiments, mass storage of the system is implemented by a SSD alone or as a disk, optical or other drive with an SSD cache. In some embodiments, the mass storage is implemented as a SSD or as a HDD along with a restore (RST) cache module. In various implementations, the HDD provides for storage of between 320 GB-4 terabytes (TB) and upward while the RST cache is implemented with a SSD having a capacity of 24 GB-256 GB. Note that such SSD cache may be configured as a single level cache (SLC) or multi-level cache (MLC) option to provide an appropriate level of responsiveness. In a SSD-only option, the module may be accommodated in various locations such as in a mSATA or NGFF slot. As an example, an SSD has a capacity ranging from 120 GB-1 TB.

Various input/output (IO) devices may be present within system 1900. Specifically shown in the embodiment of FIG. 19 is a display 1924 which may be a high definition LCD or LED panel configured within a lid portion of the chassis. This display panel may also provide for a touch screen 1925, e.g., adapted externally over the display panel such that via a user's interaction with this touch screen, user inputs can be provided to the system to enable desired operations, e.g., with regard to the display of information, accessing of information and so forth. In one embodiment, display 1924 may be coupled to processor 1910 via a display interconnect that can be implemented as a high performance graphics interconnect. Touch screen 1925 may be coupled to processor 1910 via another interconnect, which in an embodiment can be an I2C interconnect. As further shown in FIG. 19, in addition to touch screen 1925, user input by way of touch can also occur via a touch pad 1930 which may be configured within the chassis and may also be coupled to the same I2C interconnect as touch screen 1925.

The display panel may operate in multiple modes. In a first mode, the display panel can be arranged in a transparent state in which the display panel is transparent to visible light. In various embodiments, the majority of the display panel may be a display except for a bezel around the periphery. When the system is operated in a notebook mode and the display panel is operated in a transparent state, a user may view information that is presented on the display panel while also being able to view objects behind the display. In addition, information displayed on the display panel may be viewed by a user positioned behind the display. Or the operating state of the display panel can be an opaque state in which visible light does not transmit through the display panel.

In a tablet mode the system is folded shut such that the back display surface of the display panel comes to rest in a position such that it faces outwardly towards a user, when the bottom surface of the base panel is rested on a surface or held by the user. In the tablet mode of operation, the back display surface performs the role of a display and user interface, as this surface may have touch screen functionality and may perform other known functions of a conventional touch screen device, such as a tablet device. To this end, the display panel may include a transparency-adjusting layer that is disposed between a touch screen layer and a front display surface. In some embodiments the transparency-adjusting layer may be an electrochromic layer (EC), a LCD layer, or a combination of EC and LCD layers.

In various embodiments, the display can be of different sizes, e.g., an 11.6" or a 13.3" screen, and may have a 16:9 aspect ratio, and at least 300 nits brightness. Also the display may be of full high definition (HD) resolution (at least 1920×1080p), be compatible with an embedded display port (eDP), and be a low power panel with panel self refresh.

As to touch screen capabilities, the system may provide for a display multi-touch panel that is multi-touch capacitive and being at least 5 finger capable. And in some embodiments, the display may be 10 finger capable. In one embodiment, the touch screen is accommodated within a damage and scratch-resistant glass and coating (e.g., Gorilla Glass™ or Gorilla Glass 2™) for low friction to reduce "finger burn" and avoid "finger skipping". To provide for an enhanced touch experience and responsiveness, the touch panel, in some implementations, has multi-touch functionality, such as less than 2 frames (30 Hz) per static view during pinch zoom, and single-touch functionality of less than 1 cm per frame (30 Hz) with 200 ms (lag on finger to pointer). The display, in some implementations, supports edge-to-edge glass with a minimal screen bezel that is also flush with the panel surface, and limited IO interference when using multi-touch.

For perceptual computing and other purposes, various sensors may be present within the system and may be coupled to processor 1910 in different manners. Certain inertial and environmental sensors may couple to processor 1910 through a sensor hub 1940, e.g., via an I2C interconnect. In the embodiment shown in FIG. 19, these sensors may include an accelerometer 1941, an ambient light sensor (ALS) 1942, a compass 1943 and a gyroscope 1944. Other environmental sensors may include one or more thermal sensors 1946 which in some embodiments couple to processor 1910 via a system management bus (SMBus) bus.

Using the various inertial and environmental sensors present in a platform, many different use cases may be realized. These use cases enable advanced computing operations including perceptual computing and also allow for enhancements with regard to power management/battery life, security, and system responsiveness.

For example, with regard to power management/battery life issues, based at least on part on information from an ambient light sensor, the ambient light conditions in a location of the platform are determined and intensity of the display controlled accordingly. Thus, power consumed in operating the display is reduced in certain light conditions.

As to security operations, based on context information obtained from the sensors such as location information, it may be determined whether a user is allowed to access certain secure documents. For example, a user may be permitted to access such documents at a work place or a home location. However, the user is prevented from accessing such documents when the platform is present at a public location. This determination, in one embodiment, is based on location information, e.g., determined via a GPS sensor or camera recognition of landmarks. Other security operations may include providing for pairing of devices within a close range of each other, e.g., a portable platform as described herein and a user's desktop computer, mobile telephone or so forth. Certain sharing, in some implementations, are realized via near field communication when these devices are so paired. However, when the devices exceed a certain range, such sharing may be disabled. Furthermore, when pairing a platform as described herein and a smartphone, an alarm may be configured to be triggered when the devices move more than a predetermined distance from each other, when in a public location. In contrast, when these paired devices are in a safe location, e.g., a work place or home location, the devices may exceed this predetermined limit without triggering such alarm.

Responsiveness may also be enhanced using the sensor information. For example, even when a platform is in a low power state, the sensors may still be enabled to run at a relatively low frequency. Accordingly, any changes in a location of the platform, e.g., as determined by inertial sensors, GPS sensor, or so forth is determined. If no such changes have been registered, a faster connection to a previous wireless hub such as a Wi-Fi™ access point or similar wireless enabler occurs, as there is no need to scan for available wireless network resources in this case. Thus, a greater level of responsiveness when waking from a low power state is achieved.

It is to be understood that many other use cases may be enabled using sensor information obtained via the integrated sensors within a platform as described herein, and the above examples are only for purposes of illustration. Using a system as described herein, a perceptual computing system may allow for the addition of alternative input modalities, including gesture recognition, and enable the system to sense user operations and intent.

In some embodiments one or more infrared or other heat sensing elements, or any other element for sensing the presence or movement of a user may be present. Such sensing elements may include multiple different elements working together, working in sequence, or both. For example, sensing elements include elements that provide initial sensing, such as light or sound projection, followed by sensing for gesture detection by, for example, an ultrasonic time of flight camera or a patterned light camera.

Also in some embodiments, the system includes a light generator to produce an illuminated line. In some embodiments, this line provides a visual cue regarding a virtual boundary, namely an imaginary or virtual location in space, where action of the user to pass or break through the virtual boundary or plane is interpreted as an intent to engage with the computing system. In some embodiments, the illuminated line may change colors as the computing system transitions into different states with regard to the user. The illuminated line may be used to provide a visual cue for the user of a virtual boundary in space, and may be used by the system to determine transitions in state of the computer with regard to the user, including determining when the user wishes to engage with the computer.

In some embodiments, the computer senses user position and operates to interpret the movement of a hand of the user through the virtual boundary as a gesture indicating an intention of the user to engage with the computer. In some embodiments, upon the user passing through the virtual line or plane the light generated by the light generator may change, thereby providing visual feedback to the user that the user has entered an area for providing gestures to provide input to the computer.

Display screens may provide visual indications of transitions of state of the computing system with regard to a user. In some embodiments, a first screen is provided in a first state in which the presence of a user is sensed by the system, such as through use of one or more of the sensing elements.

In some implementations, the system acts to sense user identity, such as by facial recognition. Here, transition to a second screen may be provided in a second state, in which the computing system has recognized the user identity, where this second the screen provides visual feedback to the user that the user has transitioned into a new state. Transition to a third screen may occur in a third state in which the user has confirmed recognition of the user.

In some embodiments, the computing system may use a transition mechanism to determine a location of a virtual boundary for a user, where the location of the virtual boundary may vary with user and context. The computing system may generate a light, such as an illuminated line, to indicate the virtual boundary for engaging with the system. In some embodiments, the computing system may be in a waiting state, and the light may be produced in a first color. The computing system may detect whether the user has reached past the virtual boundary, such as by sensing the presence and movement of the user using sensing elements.

In some embodiments, if the user has been detected as having crossed the virtual boundary (such as the hands of the user being closer to the computing system than the virtual boundary line), the computing system may transition to a state for receiving gesture inputs from the user, where a mechanism to indicate the transition may include the light indicating the virtual boundary changing to a second color.

In some embodiments, the computing system may then determine whether gesture movement is detected. If gesture movement is detected, the computing system may proceed with a gesture recognition process, which may include the use of data from a gesture data library, which may reside in memory in the computing device or may be otherwise accessed by the computing device.

If a gesture of the user is recognized, the computing system may perform a function in response to the input, and return to receive additional gestures if the user is within the virtual boundary. In some embodiments, if the gesture is not recognized, the computing system may transition into an error state, where a mechanism to indicate the error state may include the light indicating the virtual boundary changing to a third color, with the system returning to receive additional gestures if the user is within the virtual boundary for engaging with the computing system.

As mentioned above, in other embodiments the system can be configured as a convertible tablet system that can be used in at least two different modes, a tablet mode and a notebook mode. The convertible system may have two panels, namely a display panel and a base panel such that in the tablet mode the two panels are disposed in a stack on top of one another. In the tablet mode, the display panel faces outwardly and may provide touch screen functionality as found in conventional tablets. In the notebook mode, the two panels may be arranged in an open clamshell configuration.

In various embodiments, the accelerometer may be a 3-axis accelerometer having data rates of at least 50 Hz. A gyroscope may also be included, which can be a 3-axis gyroscope. In addition, an e-compass/magnetometer may be present. Also, one or more proximity sensors may be provided (e.g., for lid open to sense when a person is in proximity (or not) to the system and adjust power/performance to extend battery life). For some OS's Sensor Fusion capability including the accelerometer, gyroscope, and compass may provide enhanced features. In addition, via a sensor hub having a real-time clock (RTC), a wake from sensors mechanism may be realized to receive sensor input when a remainder of the system is in a low power state.

In some embodiments, an internal lid/display open switch or sensor to indicate when the lid is closed/open, and can be used to place the system into Connected Standby or automatically wake from Connected Standby state. Other system sensors can include ACPI sensors for internal processor, memory, and skin temperature monitoring to enable changes to processor and system operating states based on sensed parameters.

Also seen in FIG. 19, various peripheral devices may couple to processor 1910. In the embodiment shown, various components can be coupled through an embedded controller 1935. Such components can include a keyboard 1936 (e.g., coupled via a PS2 interface), a fan 1937, and a thermal sensor 1939. In some embodiments, touch pad 1930 may also couple to EC 1935 via a PS2 interface. In addition, a security processor such as a trusted platform module (TPM) 1938 in accordance with the Trusted Computing Group (TCG) TPM Specification Version 1.2, dated Oct. 2, 2003, may also couple to processor 1910 via this LPC interconnect. However, understand the scope of the present disclosure is not limited in this regard and secure processing and storage of secure information may be in another protected location such as a static random access memory (SRAM) in a security coprocessor, or as encrypted data blobs that are only decrypted when protected by a secure enclave (SE) processor mode.

In a particular implementation, peripheral ports may include a high definition media interface (HDMI) connector (which can be of different form factors such as full size, mini or micro); one or more USB ports, such as full-size external ports in accordance with the Universal Serial Bus (USB) Revision 3.2 Specification (September 2017), with at least one powered for charging of USB devices (such as smartphones) when the system is in Connected Standby state and is plugged into AC wall power. In addition, one or more Thunderbolt™ ports can be provided. Other ports may include an externally accessible card reader such as a full size SD-XC card reader and/or a SIM card reader for WWAN (e.g., an 8 pin card reader). For audio, a 3.5 mm jack with stereo sound and microphone capability (e.g., combination functionality) can be present, with support for jack detection (e.g., headphone only support using microphone in the lid or headphone with microphone in cable). In some embodiments, this jack can be re-taskable between stereo headphone and stereo microphone input. Also, a power jack can be provided for coupling to an AC brick.

System 1900 can communicate with external devices in a variety of manners, including wirelessly. In the embodiment shown in FIG. 19, various wireless modules, each of which can correspond to a radio configured for a particular wireless communication protocol, are present. One manner for wireless communication in a short range such as a near field may be via a near field communication (NFC) unit 1945 which may communicate, in one embodiment with processor 1910 via an SMBus. Note that via this NFC unit 1945, devices in close proximity to each other can communicate. For example, a user can enable system 1900 to communicate with another portable device such as a smartphone of the user via adapting the two devices together in close relation and enabling transfer of information such as identification information payment information, data such as image data or so forth. Wireless power transfer may also be performed using a NFC system.

Using the NFC unit described herein, users can bump devices side-to-side and place devices side-by-side for near field coupling functions (such as near field communication and wireless power transfer (WPT)) by leveraging the coupling between coils of one or more of such devices. More specifically, embodiments provide devices with strategically shaped, and placed, ferrite materials, to provide for better coupling of the coils. Each coil has an inductance associated with it, which can be chosen in conjunction with the resistive, capacitive, and other features of the system to enable a common resonant frequency for the system.

As further seen in FIG. 19, additional wireless units can include other short range wireless engines including a WLAN unit 1950 and a Bluetooth unit 1952. Using WLAN unit 1950, Wi-Fi™ communications in accordance with a given Institute of Electrical and Electronics Engineers (IEEE) 802.11 standard can be realized, while via Bluetooth unit 1952, short range communications via a Bluetooth protocol can occur. These units may communicate with processor 1910 via, e.g., a USB link or a universal asynchronous receiver transmitter (UART) link. Or these units may couple to processor 1910 via an interconnect according to a Peripheral Component Interconnect Express™ (PCIe™) protocol, e.g., in accordance with the PCI Express™ Specification Base Specification version 3.0 (published Jan. 17, 2007), or another such protocol such as a serial data input/output (SDIO) standard. Of course, the actual physical connection between these peripheral devices, which may be configured on one or more add-in cards, can be by way of the NGFF connectors adapted to a motherboard.

In addition, wireless wide area communications, e.g., according to a cellular or other wireless wide area protocol, can occur via a WWAN unit 1956 which in turn may couple to a subscriber identity module (SIM) 1957. In addition, to enable receipt and use of location information, a GPS module 1955 may also be present. Note that in the embodiment shown in FIG. 8, WWAN unit 1956 and an integrated capture device such as a camera module 1954 may communicate via a given USB protocol such as a USB 2.0 or 3.0 link, or a UART or I2C protocol. Again, the actual physical connection of these units can be via adaptation of a NGFF add-in card to an NGFF connector configured on the motherboard.

In a particular embodiment, wireless functionality can be provided modularly, e.g., with a WiFi™ 802.11ac solution (e.g., add-in card that is backward compatible with IEEE 802.11abgn) with support for Windows 8 CS. This card can be configured in an internal slot (e.g., via an NGFF adapter). An additional module may provide for Bluetooth capability (e.g., Bluetooth 4.0 with backwards compatibility) as well as Intel® Wireless Display functionality. In addition NFC support may be provided via a separate device or multi-function device, and can be positioned as an example, in a front right portion of the chassis for easy access. A still additional module may be a WWAN device that can provide support for 3G/4G/LTE and GPS. This module can be implemented in an internal (e.g., NGFF) slot. Integrated antenna support can be provided for WiFi™, Bluetooth, WWAN, NFC and GPS, enabling seamless transition from WiFi™ to WWAN radios, wireless gigabit (WiGig) in accordance with the Wireless Gigabit Specification (July 2010), and vice versa.

As described above, an integrated camera can be incorporated in the lid. As one example, this camera can be a high resolution camera, e.g., having a resolution of at least 2.0 megapixels (MP) and extending to 6.0 MP and beyond.

To provide for audio inputs and outputs, an audio processor can be implemented via a digital signal processor (DSP) 1960, which may couple to processor 1910 via a high definition audio (HDA) link. Similarly, DSP 1960 may communicate with an integrated coder/decoder (CODEC) and amplifier 1962 that in turn may couple to output speakers 1963 which may be implemented within the chassis. Similarly, amplifier and CODEC 1962 can be coupled to receive audio inputs from a microphone 1965 which in an embodiment can be implemented via dual array microphones (such as a digital microphone array) to provide for high quality audio inputs to enable voice-activated control of various operations within the system. Note also that audio outputs can be provided from amplifier/CODEC 1962 to a headphone jack 1964. Although shown with these particular components in the embodiment of FIG. 19, understand the scope of the present disclosure is not limited in this regard.

In a particular embodiment, the digital audio codec and amplifier are capable of driving the stereo headphone jack, stereo microphone jack, an internal microphone array and stereo speakers. In different implementations, the codec can be integrated into an audio DSP or coupled via an HD audio path to a peripheral controller hub (PCH). In some implementations, in addition to integrated stereo speakers, one or more bass speakers can be provided, and the speaker solution can support DTS audio.

In some embodiments, processor 1910 may be powered by an external voltage regulator (VR) and multiple internal voltage regulators that are integrated inside the processor die, referred to as fully integrated voltage regulators (FIVRs). The use of multiple FIVRs in the processor enables the grouping of components into separate power planes, such that power is regulated and supplied by the FIVR to only those components in the group. During power management, a given power plane of one FIVR may be powered down or off when the processor is placed into a certain low power state, while another power plane of another FIVR remains active, or fully powered.

Power control in the processor can lead to enhanced power savings. For example, power can be dynamically allocated between cores, individual cores can change frequency/voltage, and multiple deep low power states can be provided to enable very low power consumption. In addition, dynamic control of the cores or independent core portions can provide for reduced power consumption by powering off components when they are not being used.

In different implementations, a security module such as a TPM can be integrated into a processor or can be a discrete device such as a TPM 2.0 device. With an integrated security module, also referred to as Platform Trust Technology (PTT), BIOS/firmware can be enabled to expose certain hardware features for certain security features, including secure instructions, secure boot, Intel® Anti-Theft Technology, Intel® Identity Protection Technology, Intel® Trusted Execution Technology (TxT), and Intel® Manageability Engine Technology along with secure user interfaces such as a secure keyboard and display.

Turning next to FIG. 20, another block diagram for an example computing system that may serve as a host device or peripheral device (or may include both a host device and one or more peripheral devices) in accordance with certain embodiments is shown. As a specific illustrative example, SoC 2000 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SoC 2000 includes 2 cores—2006 and 2007. Similar to the discussion above, cores 2006 and 2007 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 2006 and 2007 are coupled to cache control 2008 that is associated with bus interface unit 2009 and L2 cache 2010 to communicate with other parts of system 2000. Interconnect 2012 includes an on-chip interconnect, such as an IOSF, AMBA, or other interconnect discussed above, which potentially implements one or more aspects of the described disclosure.

Interconnect 2012 provides communication channels to the other components, such as a Subscriber Identity Module (SIM) 2030 to interface with a SIM card, a boot rom 2035 to hold boot code for execution by cores 2006 and 2007 to initialize and boot SoC 2000, a SDRAM controller 2040 to interface with external memory (e.g. DRAM 2060), a flash controller 2045 to interface with non-volatile memory (e.g. Flash 2065), a peripheral control 2050 (e.g. Serial Peripheral Interface) to interface with peripherals, video codecs 2020 and Video interface 2025 to display and receive input (e.g. touch enabled input), GPU 2015 to perform graphics related computations, etc. Any of these interfaces may incorporate aspects of the disclosure described herein.

In addition, the system illustrates peripherals for communication, such as a Bluetooth module 2070, 3G modem 2075, GPS 2080, and WiFi 2085. Note as stated above, a UE includes a radio for communication. As a result, these peripheral communication modules are not all required. However, in a UE some form of a radio for external communication is to be included.

Although the drawings depict particular computer systems, the concepts of various embodiments are applicable to any suitable integrated circuits and other logic devices. Examples of devices in which teachings of the present disclosure may be used include desktop computer systems, server computer systems, storage systems, handheld devices, tablets, other thin notebooks, systems on a chip (SOC) devices, and embedded applications. Some examples of handheld devices include cellular phones, digital cameras, media players, personal digital assistants (PDAs), and handheld PCs. Embedded applications may include, e.g., a microcontroller, a digital signal processor (DSP), an SOC, a network computer (NetPC), a set-top box, a network hub, a wide area network (WAN) switch, or any other system that can perform the functions and operations taught below. Various embodiments of the present disclosure may be used in any suitable computing environment, such as a personal computing device, a server, a mainframe, a cloud computing service provider infrastructure, a datacenter, a communications service provider infrastructure (e.g., one or more portions of an Evolved Packet Core), or other environment comprising a group of computing devices.

A design may go through various stages, from creation to simulation to fabrication. Data representing a design may represent the design in a number of manners. First, as is useful in simulations, the hardware may be represented using a hardware description language (HDL) or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In some implementations, such data may be stored in a database file format such as Graphic Data System II (GDS II), Open Artwork System Interchange Standard (OASIS), or similar format.

In some implementations, software based hardware models, and HDL and other functional description language objects can include register transfer language (RTL) files, among other examples. Such objects can be machine-parsable such that a design tool can accept the HDL object (or model), parse the HDL object for attributes of the described hardware, and determine a physical circuit and/or on-chip layout from the object. The output of the design tool can be used to manufacture the physical device. For instance, a design tool can determine configurations of various hardware and/or firmware elements from the HDL object, such as bus widths, registers (including sizes and types), memory blocks, physical link paths, fabric topologies, among other attributes that would be implemented in order to realize the system modeled in the HDL object. Design tools can include tools for determining the topology and fabric configurations of system on chip (SoC) and other hardware device. In some instances, the HDL object can be used as the basis for developing models and design files that can be used by manufacturing equipment to manufacture the described hardware. Indeed, an HDL object itself can be provided as an input to manufacturing system software to cause the described hardware.

In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

In various embodiments, a medium storing a representation of the design may be provided to a manufacturing system (e.g., a semiconductor manufacturing system capable of manufacturing an integrated circuit and/or related components). The design representation may instruct the system to manufacture a device capable of performing any combination of the functions described above. For example, the design representation may instruct the system regarding which components to manufacture, how the components should be coupled together, where the components should be placed on the device, and/or regarding other suitable specifications regarding the device to be manufactured.

A module as used herein or as depicted in the FIGs. refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Logic may be used to implement any of the flows described or functionality of the various components of the FIGs., subcomponents thereof, or other entity or component described herein. "Logic" may refer to hardware, firmware, software and/or combinations of each to perform one or more functions. In various embodiments, logic may include a microprocessor or other processing element operable to execute software instructions, discrete logic such as an application specific integrated circuit (ASIC), a programmed logic device such as a field programmable gate array (FPGA), a storage device containing instructions, combinations of logic devices (e.g., as would be found on a printed circuit board), or other suitable hardware and/or software. Logic may include one or more gates or other circuit components. In some embodiments, logic may also be fully embodied as software. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in storage devices.

Use of the phrase 'to' or 'configured to,' in one embodiment, refers to arranging, putting together, manufacturing, offering to sell, importing, and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example, the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash storage devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Example 1 includes an apparatus comprising an interconnect comprising a conductive core; a first conductive layer directly connected to a first end of the conductive core but not directly connected to a second end of the conductive core; a second conductive layer directly connected to the second end of the conductive core but not directly connected to the second end of the conductive core; a first non-conductive layer between the conductive core and the first conductive layer; and a second non-conductive layer between the first conductive layer and the second conductive layer.

Example 2 includes the subject matter of Example 1, and wherein the interconnect comprises a cylindrical pin.

Example 3 includes the subject matter of any of Examples 1 and 2, and wherein the interconnect comprises a planar pin.

Example 4 includes the subject matter of any of Examples 1-3, and wherein the conductive core has a cylindrical shape.

Example 5 includes the subject matter of any of Examples 1-4, and wherein the interconnect further comprises a spring inside of the conductive core.

Example 6 includes the subject matter of any of Examples 1-5, the interconnect further comprising a third conductive layer directly connected to the first end of the conductive core but not directly connected to the second end of the conductive core; a fourth conductive layer directly connected to the second end of the conductive core but not directly connected to the second end of the conductive core; a third non-conductive layer between the second conductive layer and the third conductive layer; and a fourth non-conductive layer between the third conductive layer and the fourth conductive layer.

Example 7 includes the subject matter of any of Examples 1-6, and wherein a dielectric constant of the second non-conductive layer is greater than four.

Example 8 includes the subject matter of any of Examples 1-7, and wherein the first conductive layer spans a majority of a length of the conductive core and the second conductive layer spans a majority of the length conductive core.

Example 9 includes the subject matter of any of Examples 1-8, and wherein the interconnect is a cylindrical interconnect embedded in a printed circuit board.

Example 10 includes the subject matter of any of Examples 1-9, and wherein the interconnect is a planar interconnect embedded in a printed circuit board.

Example 11 includes a system comprising a plurality of interconnects, wherein an interconnect comprises a conductive core; a first conductive layer directly connected to a first end of the conductive core but not directly connected to a second end of the conductive core; a second conductive layer directly connected to the second end of the conductive core but not directly connected to the second end of the conductive core; a first non-conductive layer between the conductive core and the first conductive layer; and a second non-conductive layer between the first conductive layer and the second conductive layer.

Example 12 includes the subject matter of Example 11, and further including a semiconductor package comprising the plurality of interconnects.

Example 13 includes the subject matter of any of Examples 11 and 12, and wherein the semiconductor package further comprises a memory chip.

Example 14 includes the subject matter of any of Examples 11-13, and wherein the semiconductor package further comprises a processor unit.

Example 15 includes the subject matter of any of Examples 11-14, and further including a battery communicatively coupled to the processor unit, a display communicatively coupled to the processor unit, or a network interface communicatively coupled to the processor unit.

Example 16 includes the subject matter of any of Examples 11-15, and wherein the interconnect comprises a cylindrical pin.

Example 17 includes the subject matter of any of Examples 11-16, and wherein the interconnect comprises a planar pin.

Example 18 includes the subject matter of any of Examples 11-17, and wherein the conductive core has a cylindrical shape.

Example 19 includes the subject matter of any of Examples 11-18, and wherein the interconnect further comprises a spring inside of the conductive core.

Example 20 includes the subject matter of any of Examples 11-19, the interconnect further comprising a third conductive layer directly connected to the first end of the conductive core but not directly connected to the second end of the conductive core; a fourth conductive layer directly connected to the second end of the conductive core but not directly connected to the second end of the conductive core; a third non-conductive layer between the second conductive layer and the third conductive layer; and a fourth non-conductive layer between the third conductive layer and the fourth conductive layer.

Example 21 includes the subject matter of any of Examples 11-20, and wherein a dielectric constant of the second non-conductive layer is greater than four.

Example 22 includes the subject matter of any of Examples 11-21, and wherein the first conductive layer spans a majority of a length of the conductive core and the second conductive layer spans a majority of the length conductive core.

Example 23 includes the subject matter of any of Examples 11-22, and wherein the interconnect is a cylindrical interconnect embedded in a printed circuit board.

Example 24 includes the subject matter of any of Examples 11-23, and wherein the interconnect is a planar interconnect embedded in a printed circuit board.

Example 25 includes a method comprising forming a conductive core; forming a first conductive layer directly connected to a first end of the conductive core but not directly connected to a second end of the conductive core; forming a second conductive layer directly connected to the second end of the conductive core but not directly connected to the second end of the conductive core; forming a first non-conductive layer between the conductive core and the first conductive layer; and forming a second non-conductive layer between the first conductive layer and the second conductive layer.

Example 26 includes the subject matter of any of Example 25, and further including forming a third conductive layer directly connected to the first end of the conductive core but not directly connected to the second end of the conductive core; forming a fourth conductive layer directly connected to the second end of the conductive core but not directly connected to the second end of the conductive core; forming a third non-conductive layer between the second conductive layer and the third conductive layer; and forming a fourth non-conductive layer between the third conductive layer and the fourth conductive layer.

Example 27 includes the subject matter of any of Examples 25-26, and further including trimming off a portion of the first conductive layer that is directly connected to a second end of the conductive core.

Example 28 includes the subject matter of any of Examples 25-27, and further including placing a spring inside of the conductive core.

Example 29 includes the subject matter of any of Examples 25-28, and further including welding a first joint connecting the first conductive layer to the first end of the conductive core and welding a second joint connecting the second conductive layer to the second end of the conductive core.

Example 30 includes the subject matter of any of Examples 25-29, and further including forming a semiconductor package comprising the plurality of interconnects.

Example 31 includes the subject matter of any of Examples 25-30, and wherein the semiconductor package further comprises a memory chip.

Example 32 includes the subject matter of any of Examples 25-31, and wherein the semiconductor package further comprises a processor unit.

Example 33 includes the subject matter of any of Examples 25-32, and further including coupling a battery, a display, or a network interface to the processor unit.

Example 34 includes the subject matter of any of Examples 25-33, and wherein the interconnect comprises a cylindrical pin.

Example 35 includes the subject matter of any of Examples 25-34, and wherein the interconnect comprises a planar pin.

Example 36 includes the subject matter of any of Examples 25-35, and wherein the conductive core has a cylindrical shape.

Example 37 includes the subject matter of any of Examples 25-36, and wherein the interconnect further comprises a spring inside of the conductive core.

Example 38 includes the subject matter of any of Examples 25-37, and wherein a dielectric constant of the second non-conductive layer is greater than four.

Example 39 includes the subject matter of any of Examples 25-38, and wherein the first conductive layer spans a majority of a length of the conductive core and the second conductive layer spans a majority of the length conductive core.

Example 40 includes the subject matter of any of Examples 25-39, and wherein the interconnect is a cylindrical interconnect embedded in a printed circuit board.

Example 41 includes the subject matter of any of Examples 25-40, and wherein the interconnect is a planar interconnect embedded in a printed circuit board.

What is claimed is:

1. An apparatus comprising:

an interconnect comprising:

a conductive core;

a first conductive layer connected to the conductive core and extending parallel to the conductive core towards a first end of the conductive core;

a second conductive layer connected to the conductive core and extending parallel to the conductive core towards a second end of the conductive core;

a first non-conductive layer between the conductive core and the first conductive layer; and a second non-conductive layer between the first conductive layer and the second conductive layer.

2. The apparatus of claim 1, wherein the interconnect comprises a cylindrical pin.

3. The apparatus of claim 1, wherein the interconnect comprises a planar pin.

4. The apparatus of claim 1, the interconnect further comprising:

a third conductive layer connected to the conductive core and the first conductive layer and extending parallel to the conductive core towards the first end of the conductive core;

a fourth conductive layer connected to the conductive core and the second conductive layer and extending parallel to the conductive core towards the second end of the conductive core;

a third non-conductive layer between the second conductive layer and the third conductive layer; and a fourth non-conductive layer between the third conductive layer and the fourth conductive layer.

5. The apparatus of claim 1, wherein a dielectric constant of the second non-conductive layer is greater than four.

6. The apparatus of claim 1, wherein the first conductive layer and second conductive layer are both parallel to the conductive core over a majority of a length of the conductive core.

7. The apparatus of claim 1, wherein the interconnect is a cylindrical interconnect embedded in a printed circuit board.

8. The apparatus of claim 1, wherein the interconnect is a planar interconnect embedded in a printed circuit board.

9. The apparatus of claim 1, wherein the conductive core has a cylindrical shape.

10. The apparatus of claim 9, wherein the interconnect further comprises a spring inside of the conductive core.

11. A system comprising:

a plurality of interconnects, wherein an interconnect comprises:

a conductive core;

a first conductive layer connected to the conductive core and extending parallel to the conductive core towards a first end of the conductive core;

a second conductive layer connected to the conductive core and extending parallel to the conductive core towards a second end of the conductive core;

a first non-conductive layer between the conductive core and the first conductive layer; and a second non-conductive layer between the first conductive layer and the second conductive layer.

12. The system of claim 11, further comprising a semiconductor package comprising the plurality of interconnects.

13. The system of claim 12, wherein the semiconductor package further comprises a memory chip.

14. The system of claim 12, wherein the semiconductor package further comprises a processor unit.

15. The system of claim 14, further comprising a battery communicatively coupled to the processor unit, a display communicatively coupled to the processor unit, or a network interface communicatively coupled to the processor unit.

16. A method comprising:

forming a conductive core;

forming a first conductive layer connected to the conductive core and extending parallel to the conductive core towards a first end of the conductive core;

forming a second conductive layer connected to the conductive core and extending parallel to the conductive core towards a second end of the conductive core;

forming a first non-conductive layer between the conductive core and the first conductive layer; and forming a second non-conductive layer between the first conductive layer and the second conductive layer.

17. The method of claim 16, further comprising:

forming a third conductive layer connected to the conductive core and the first conductive layer and extending parallel to the conductive core towards the first end of the conductive core;

forming a fourth conductive layer connected to the conductive core and the second conductive layer and extending parallel to the conductive core towards the second end of the conductive core;

forming a third non-conductive layer between the second conductive layer and the third conductive layer; and forming a fourth non-conductive layer between the third conductive layer and the fourth conductive layer.

18. The method of claim 16, further comprising trimming off a portion of the first conductive layer that is connected to a second end of the conductive core.

19. The method of claim 16, further comprising placing a spring inside of the conductive core.

20. The method of claim 16, further comprising welding a first joint connecting the first conductive layer to the conductive core and welding a second joint connecting the second conductive layer to the conductive core.

* * * * *